(12) United States Patent
Luo et al.

(10) Patent No.: US 11,528,616 B2
(45) Date of Patent: *Dec. 13, 2022

(54) ENHANCED PREAMBLE WAVEFORM FOR COEXISTENCE

(71) Applicant: QUALCOMM Incorporated, San Diego, CA (US)

(72) Inventors: Tao Luo, San Diego, CA (US); Arumugam Chendamarai Kannan, San Diego, CA (US); Bin Tian, San Diego, CA (US); Rahul Malik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 17/062,378

(22) Filed: Oct. 2, 2020

(65) Prior Publication Data

US 2021/0029553 A1  Jan. 28, 2021

Related U.S. Application Data

(63) Continuation of application No. 15/078,095, filed on Mar. 23, 2016, now Pat. No. 10,917,795.

(Continued)

(51) Int. Cl.
*H04W 16/14* (2009.01)
*H04L 27/00* (2006.01)
(Continued)

(52) U.S. Cl.
CPC ......... *H04W 16/14* (2013.01); *H04L 27/0006* (2013.01); *H04L 27/2613* (2013.01);
(Continued)

(58) Field of Classification Search
CPC . B62D 43/10; H04L 27/0006; H04L 27/2613; H04W 16/14; H04W 74/0808
See application file for complete search history.

(56) References Cited

U.S. PATENT DOCUMENTS

2006/0274863 A1  12/2006  Haentzschel et al.
2011/0143768 A1   6/2011  Lane et al.
(Continued)

FOREIGN PATENT DOCUMENTS

CN  103416017 A  11/2013
CN  104272605 A   1/2015
(Continued)

OTHER PUBLICATIONS

ETRI: "Design of Variable-Length Preamble for Modified LBE and Fine Frequency/Time Synchronization", 3GPP TSG-RAN1#80, 3GPP Draft; R1-150647 Detailed Variable Length Preamble Design, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 9, 2015-Feb. 13, 2015, Feb. 8, 2015 (Feb. 8, 2015), 5 Pages, XP050933849, Retrieved from the Internet: URL: http://www.3gpp.org/ftp/Meetings_3GPP_SYNC/RAN1/Docs/ [retrieved on Feb. 8, 2015].
(Continued)

*Primary Examiner* — Zhensheng Zhang
(74) *Attorney, Agent, or Firm* — Holland & Hart LLP

(57) ABSTRACT

Methods, systems, and devices are described for wireless communication at a device. A Long Term Evolution Unlicensed (LTE-U) device may transmit an enhanced preamble that may be understood by Wireless Local Area Network (WLAN) devices, in addition to conveying a characteristic that is detectable by receiving LTE-U devices. The transmitting LTE-U device may generate the enhanced preamble by generating a first training field and a second training field. The characteristic that is detectable by receiving LTE-U
(Continued)

devices may be a phase shift between the first and second training fields. Additionally or alternatively, the characteristic may be a sequence or tone mapping of the first or second training field. In some cases, the transmitting LTE-U device may introduce a third training field to the preamble which serves as the characteristic.

20 Claims, 12 Drawing Sheets

Related U.S. Application Data

(60) Provisional application No. 62/142,359, filed on Apr. 2, 2015.

(51) Int. Cl.
    *H04W 74/08*     (2009.01)
    *H04L 27/26*     (2006.01)

(52) U.S. Cl.
    CPC ... *H04W 74/0808* (2013.01); *H04L 27/26132* (2021.01); *H04L 27/26136* (2021.01)

(56) References Cited

U.S. PATENT DOCUMENTS

| | | | |
|---|---|---|---|
| 2013/0070653 A1 | 3/2013 | Banister et al. | |
| 2013/0170347 A1* | 7/2013 | Zhang | H04W 76/18 370/331 |
| 2013/0294356 A1 | 11/2013 | Bala et al. | |
| 2014/0198739 A1* | 7/2014 | Kenney | H04L 5/0062 370/329 |
| 2014/0269778 A1* | 9/2014 | Yang | H04J 3/0697 370/503 |
| 2016/0295420 A1 | 10/2016 | Luo et al. | |

FOREIGN PATENT DOCUMENTS

| | | |
|---|---|---|
| CN | 105592467 A | 5/2016 |
| WO | WO-2014081421 A1 | 5/2014 |
| WO | WO-2015017463 A2 | 2/2015 |
| WO | WO-2016000835 A1 | 1/2016 |
| WO | WO-2016074096 A1 | 5/2016 |

OTHER PUBLICATIONS

ETRI: "Preamble Field for Time-Aligned Load Based Equipment Type LBT Mechanism", 3GPP Draft; 3GPP TSG-RAN WG1#79, R1-144919 LTE-LAA_CCA_RBKOFF_PRLE_V2, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), 5 Pages, XP050875973, Retrieved from the Internet: URL: http://www.3gpp.org/ftp/Meetings_3GPP_SYNC/RAN1/Docs/ [retrieved on Nov. 17, 2014] Sections 2.2-2.3; p. 2; figure 1.

International Preliminary Report on Patentability—PCT/US2016/024081, The International Bureau of WIPO—Geneva, Switzerland, dated Oct. 3, 2017.

International Search Report and Written Opinion—PCT/US2016/024081—ISA/EPO—dated Jun. 30, 2016.

\* cited by examiner

ENHANCED PREAMBLE WAVEFORM FOR COEXISTENCE

CROSS REFERENCES

The present Applications for Patent is a Continuation of U.S. patent application Ser. No. 15/078,095 by Luo, et al., entitled "An Enhanced Preamble Waveform For Coexistence" filed Mar. 23, 2016, which claims priority to U.S. Provisional Patent Application No. 62/142,359 by Luo, et al., entitled "An Enhanced Preamble Waveform for Coexistence," filed Apr. 2, 2015, assigned to the assignee hereof.

BACKGROUND

Field of Disclosure

The following relates generally to wireless communication, and more specifically to an enhanced preamble waveform for co-existence of multiple radio access technologies (RATs) over a shared frequency band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may operate according to a first radio access technology (RAT), such as Wi-Fi, and may include a number of base stations or access points (APs), each simultaneously supporting communication for multiple mobile devices or stations (STAs). APs may communicate with STAs on downstream and upstream links. In some cases both types of communication systems may operate in the presence of one another and may use shared resources. A second wireless multiple-access communications system may operate according to a second RAT, such as Long Term Evolution (LTE) and may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In a wireless local area network (WLAN), such as Wi-Fi, an AP may communicate with multiple STAs over a shared radio frequency spectrum. The STAs may use contention procedures that include communicating one or more control frames prior to establishing a communication link, such that confirmation of the communication link via exchange of control frames limits interference experienced by nearby communication devices. One example of such techniques include Request to Send (RTS) and Clear to Send (CTS) messaging, where, for example, a STA looking to communicate with another device (e.g., another STA or AP), may first send an RTS frame to the device. Once the recipient device receives the RTS frame, the recipient device may confirm the communication link by sending a CTS frame. After the CTS frame is received by the STA, the STA may then begin transmitting data to the recipient device. In this way, RTS/CTS messaging can reduce frame collisions by enabling a device, such as a STA or AP (e.g., by clearing the communication path before transmitting data to an AP or STA).

In an LTE network, a base station and a UE may communicate over a dedicated frequency spectrum or over different frequency bands of the radio frequency spectrum (e.g., a dedicated radio frequency band and a shared radio frequency band) of a cellular network. With increasing data traffic in cellular networks that use dedicated (e.g., licensed) radio frequency bands, offloading at least some data traffic to a shared radio frequency spectrum may provide a cellular operator with opportunities for enhanced data transmission capacity. A shared radio frequency spectrum may also provide service in areas where access to a dedicated radio frequency spectrum is unavailable. Operation using LTE signal waveforms over the shared radio frequency spectrum may be called LTE-Unlicensed (LTE-U) operation, and an LTE device supporting LTE-U operation may be called an LTE-U device.

Prior to gaining access to and communicating over a shared radio frequency spectrum in LTE-U operation, a base station or UE may perform a listen before talk (LBT) procedure to contend for access to the shared radio frequency spectrum. This LBT procedure may be compatible with contention procedures used by Wi-Fi devices to gain access to the shared radio frequency spectrum. An LBT procedure may include performing a clear channel assessment (CCA) procedure to determine whether a channel of the shared radio frequency spectrum is available. When it is determined that the channel of the shared radio frequency spectrum is available, an LTE-U channel usage beacon signal (CUBS) may be transmitted to reserve the channel. A different UE or base station may receive and decode the CUBS and discontinue contention procedures, while a STA or AP may monitor the shared channel and use energy detection to determine that a CUBS has been transmitted. After identifying the CUBS, other base stations or UEs may utilize resources on the shared channel that are not being used by the transmitting UE. After determining the detected energy is above a threshold, Wi-Fi devices may refrain from transmitting on the first channel for a period of time. However, other Wi-Fi devices on the shared channel may determine that the energy of the CUBS does not satisfy a threshold or may not receive the CUBS at all. These other Wi-Fi devices may thus continue using the channel, or one or more interfering channels (e.g., an overlapping or adjacent channel), in a manner that interferes with the base station's or UE's reservation and use of the channel.

In some examples, the energy detection circuit of a Wi-Fi device may be less sensitive than the signal reception and decoding circuit used for detecting Wi-Fi transmissions (e.g., Wi-Fi preambles or Wi-Fi packets (e.g., CTS-to-Self packets, etc.)). The base station or UE may thus transmit a channel reservation indication understood by Wi-Fi devices. A channel reservation indication transmitted in this manner may be detected by the Wi-Fi devices in scenarios in which the energy level of a CUBS may not be detectable. However, if an LTE-U device transmits a Wi-Fi preamble, the other LTE-U devices within range may be unable to distinguish a Wi-Fi preamble sent from a Wi-Fi device from a channel reservation indicator sent from an LTE-U device, which may restrict resource and interference management between LTE-U devices. Therefore, coexistence between Wi-Fi and LTE-U devices over shared frequency bands presents many challenges.

SUMMARY

An LTE-U device may transmit an enhanced preamble that may be understood by WLAN devices, in addition to conveying additional characteristics that are detectable by LTE-U devices and/or WLAN devices. In some examples, an LTE-U device may generate the enhanced preamble by generating a first training field and a second training field. In one example, the enhanced preamble signal may include a phase shift between the first and second training fields of the preamble that is indicative of the radio access technology (RAT) used by the LTE-U device. Additionally or alternatively, the enhanced preamble signal may include the sequence or tone mapping of the first or second training field that is indicative of the RAT used by the LTE-U device. In some cases, the LTE-U device may introduce an additional training field to the preamble that is indicative of the RAT. The LTE-U device may furthermore transmit the enhanced preamble at intervals that coincide with LTE-U boundaries. The LTE-U device may generate the enhanced preamble so that WLAN preamble properties are preserved. In some cases, the enhanced preamble may convey LTE-U-specific characteristics to receiving LTE-U devices or WLAN devices.

A method of wireless communication is described. The method may include generating, by a device employing the second RAT, a plurality of training fields of a preamble signal. One or more of the plurality of training fields may have a signal property that is associated with detection by devices employing the first RAT. The preamble signal may convey at least one characteristic that is associated with the second RAT. The method may also include transmitting the preamble signal over the frequency channel.

An apparatus for wireless communication is described. The apparatus may include means for generating a plurality of training fields of a preamble signal. One or more of the plurality of training fields may have a signal property that is associated with detection by devices employing the first RAT. The preamble signal may convey at least one characteristic that is associated with the second RAT. The apparatus may also include means for transmitting the preamble signal over the frequency channel.

A further apparatus is described. The apparatus may include a processor, memory in electronic communication with the processor, and instructions stored in the memory. The instructions may be operable, when executed by the processor, to cause the apparatus to generate a plurality of training fields of a preamble signal. One or more of the plurality of training fields may have a signal property that is associated with detection by devices employing the first RAT. The preamble signal may convey at least one characteristic that is associated with the second RAT. The instructions may be further executable to cause the apparatus to transmit the preamble signal over the frequency channel.

A non-transitory computer readable medium for wireless communication is described. The non-transitory computer-readable medium may store code for wireless communication. The code may include instructions executable to cause an apparatus to generate a set of training fields of a preamble signal. One or more of the set of training fields may have a signal property that is associated with detection by devices employing the first RAT. The preamble signal may convey at least one characteristic that is associated with the second RAT. The code may include instructions executable to cause the apparatus to transmit the preamble signal over the frequency channel.

In some examples of the method, apparatus, or non-transitory computer-readable medium described above, the at least one characteristic comprises a phase shift between a first training field and a second training field of the set of training fields. In some examples of the method, apparatus, or non-transitory computer-readable medium described above, the at least one characteristic comprises at least one of a sequence or a tone mapping associated with at least one of a first training field or a second training field of the set of training fields.

In some examples of the method, apparatus, or non-transitory computer-readable medium described above, generating the set of training fields comprises generating a first training field, a second training field, and a third training field. A signal associated with the third training field may have an inverted sign at intervals that are less than or equal to one half of a symbol period associated with the first training field. In some examples of the method, apparatus, or non-transitory computer-readable medium described above, generating the set of training fields comprises aligning at least one of a beginning or an end of at least one of a first training field or a second training field of the set of training fields with at least one of a symbol period, a subframe period, or a frame period associated with the second RAT.

In some examples of the method, apparatus, or non-transitory computer-readable medium described above, the at least one characteristic indicates at least one of a device type or an operator associated with the second RAT. In some examples of the method, apparatus, or non-transitory computer-readable medium described above, the first RAT comprises a WLAN RAT and the set of training fields comprises a short training field (STF) and a long training field (LTF) for the WLAN RAT. The second RAT may comprise an LTE RAT or an LTE-U RAT.

A method of wireless communication is described. The method may include receiving a preamble signal over a frequency channel shared by a first RAT and a second RAT. The preamble signal may comprise a plurality of training fields. One or more of the plurality of training fields may have a signal property that is associated with detection by devices employing the first RAT. The preamble signal may convey at least one characteristic that is associated with the second RAT. The method may also include determining that a transmitter device associated with the received preamble signal is associated with the second RAT by identifying, in the received preamble signal, the signal property that is associated with detection by devices employing the first RAT and detecting the at least one characteristic that is associated with the second RAT.

An apparatus for wireless communication is described. The apparatus may include means for receiving a preamble signal over a frequency channel shared by a first RAT and a second RAT. The preamble signal may comprise a plurality of training fields. One or more of the plurality of training fields may have a signal property that is associated with detection by devices employing the first RAT. The preamble signal may convey at least one characteristic that is associated with the second RAT. The apparatus may also include means for determining that a transmitter device associated with the received preamble signal is associated with the second RAT by identifying, in the received preamble signal, the signal property that is associated with detection by devices employing the first RAT and detecting the at least one characteristic that is associated with the second RAT.

A further apparatus is described. The apparatus may include a processor, memory in electronic communication with the processor, and instructions stored in the memory. The instructions may be operable, when executed by the processor, to cause the apparatus to receive a preamble signal over a frequency channel shared by a first RAT and a second RAT. The preamble signal may comprise a plurality of training fields. One or more of the plurality of training fields may have a signal property that is associated with detection by devices employing the first RAT. The preamble signal may convey at least one characteristic that is associated with the second RAT. The instructions may be further executable to cause the apparatus to determine that a transmitter device associated with the received preamble signal is associated with the second RAT by identifying, in the received preamble signal, the signal property that is associated with detection by devices employing the first RAT and detecting the at least one characteristic that is associated with the second RAT.

A non-transitory computer readable medium for wireless communication is described. The non-transitory computer-readable medium may include code comprising instructions executable to cause an apparatus to receive a preamble signal over a frequency channel shared by a first RAT and a second RAT. The preamble signal may comprise a set of training fields. One or more of the set of training fields may have a signal property that is associated with detection by devices employing the first RAT. The preamble signal may convey at least one characteristic that is associated with the second RAT. The code may further include instructions executable to cause the apparatus to determine that a transmitter device associated with the received preamble signal is associated with the second RAT by identifying, in the received preamble signal, the signal property that is associated with detection by devices employing the first RAT and detecting the at least one characteristic that is associated with the second RAT.

In some examples of the method, apparatus, or non-transitory computer-readable medium described above, detecting the at least one characteristic comprises detecting, in the received preamble signal, a phase shift between a first training field and a second training field of the set of training fields that is identifiable by the second RAT. In some examples of the method, apparatus, or non-transitory computer-readable medium described above, the at least one characteristic comprises at least one of a sequence associated with at least one of a first training field and a second training field of the set of training fields that is identifiable by the second RAT or a tone mapping associated with at least one of the first training field and the second training field that is identifiable by the second RAT.

In some examples of the method, apparatus, or non-transitory computer-readable medium described above, detecting the at least one characteristic comprises identifying, in the received preamble signal, a first training field and a second training field of the set of training fields associated with the first RAT. Some examples of the method, apparatus, or non-transitory computer-readable medium described above may further include processes, features, means, or instructions for identifying, in the received preamble signal, a third training field of the set of training fields associated with the second RAT, where a signal associated with the third training field is inverted at intervals that are a divisor of a symbol period that is identifiable by the first training field.

Some examples of the method, apparatus, or non-transitory computer-readable medium described above may further include processes, features, means, or instructions for detecting the at least one characteristic by detecting at least one of a beginning and an end of the preamble signal is aligned with a symbol period associated with the second RAT. Determining that the transmitter device associated with the received preamble signal is associated with the second RAT may include determining the preamble signal is aligned with the symbol period associated with the second RAT. Some examples of the method, apparatus, or non-transitory computer-readable medium described above may further include processes, features, means, or instructions for identifying at least one of a device type or an operator associated with the transmitter device based on the at least one characteristic.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

According to the present disclosure, a Long Term Evolution unlicensed (LTE-U) device may perform channel reservation using an enhanced preamble that may improve coexistence between the LTE-U device and wireless local area network (WLAN) devices sharing channels of a shared spectrum frequency band. A shared radio frequency spectrum band may be, for example, an unlicensed radio frequency spectrum band, a licensed radio frequency spectrum band having more than one licensed operator, or a licensed radio frequency spectrum band providing for opportunistic sharing of resources of the licensed radio frequency spectrum band. According to various aspects, an LTE-U device may generate an enhanced preamble detectable by WLAN devices that also includes a characteristic that indicates the associated transmission will be an LTE-U based transmission. The characteristic may be a phase shift, a sequence mapping, an additional field, or an alignment with an LTE boundary. The enhanced preamble may be modified with respect to a WLAN preamble transmitted by WLAN devices. The enhanced preamble may preserve the WLAN properties so that WLAN devices may receive the enhanced preamble, in addition to being detectable by LTE-U devices. The LTE-U devices may use the detection of the characteristic to determine the source of the preamble (e.g., another LTE-U device) and to learn other LTE-U specific characteristics. These and other aspects of the disclosure are further illustrated by and described with reference to apparatus diagrams, system diagrams, and flowcharts.

Figure 1:
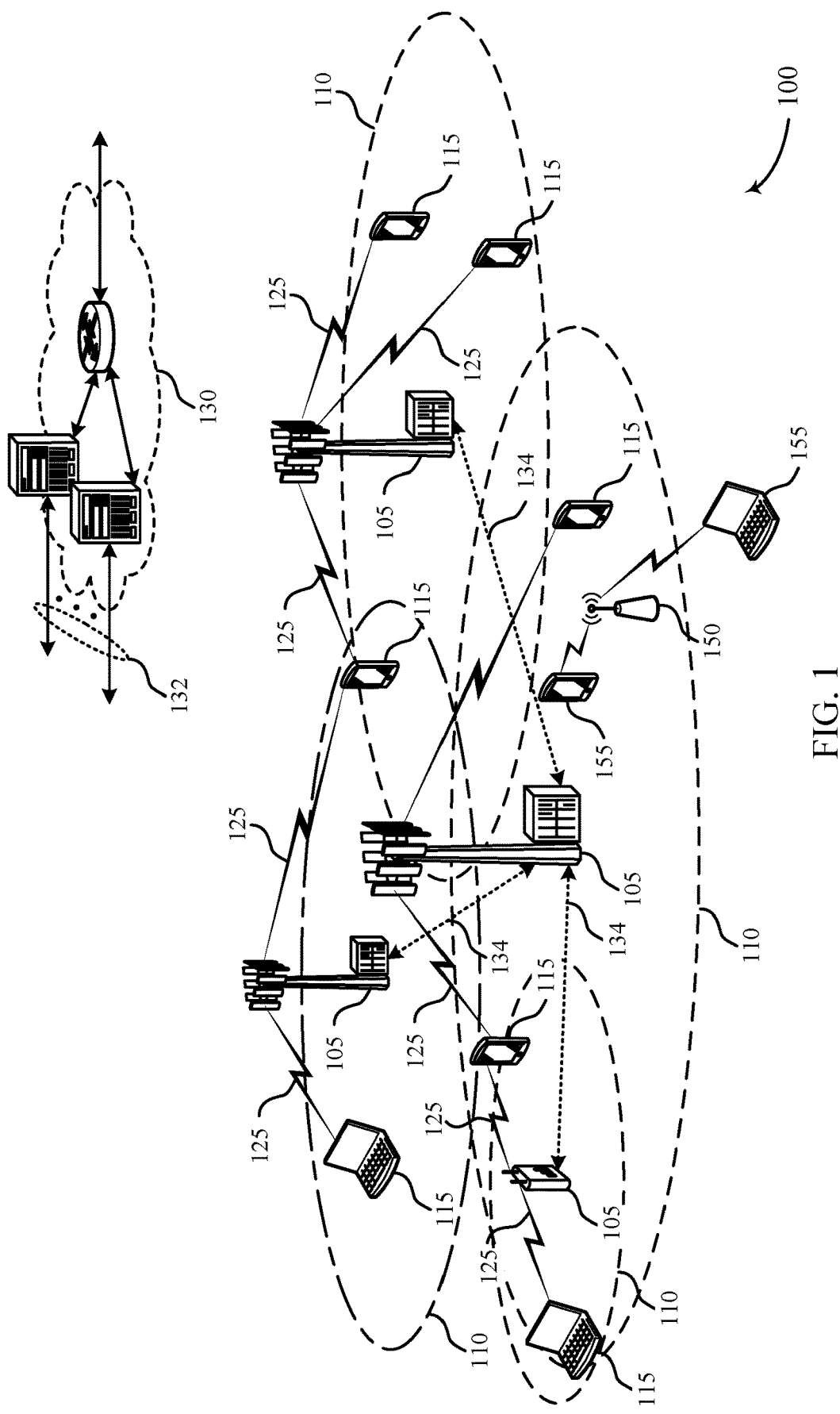
FIG. 1 illustrates an example of a wireless communications system that supports preamble waveform for coexistence in accordance with various aspects of the present disclosure.

FIG. 1 illustrates an example of a wireless communications system 100 in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., 51, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g. X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is an LTE/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communications system 100 may operate according to a first radio access technology (e.g., a Wi-Fi technology), but operate in the presence of one or more networks or nodes operating according to a second radio access technology (e.g., a cellular radio access technology, such as an LTE/LTE-A technology). By way of example, FIG. 1 shows a network that includes a Wi-Fi access point (AP) 150 in communication with Wi-Fi stations (STAs) 155. In some examples, a UE 115 or base station 105 may support LTE-U operation in unlicensed bands used by Wi-Fi. In the interest of clarity, LTE-U capable devices will be referred to as base stations 105 or UEs 115 and non LTE-U capable devices will be referred to as APs 150 or STAs 155. However, it should be understood that STA 155 or AP 150 may be Wi-Fi devices that support LTE but may not be configured for LTE-U operation.

A Wi-Fi device, such as a STA 155 or AP 150, may identify a Wi-Fi preamble by using certain signal properties associated with the preamble. In some cases, a Wi-Fi preamble may include a legacy short training field (L-STF) and a legacy long training field (L-LTF). In some examples, the L-STF may include 10 repetitions of a short training symbol. Each short training symbol may have a periodicity of 0.8 μs and the L-STF may, therefore, be 8 μs in time. The L-STF may be used for automatic gain control (AGC), to determine the initial frequency, and timing estimation. The L-STF symbols may be generated using a frequency domain sequence and an N-point inverse fast fourier transform (IFFT). For instance, a sequence of complex values may be mapped to 12 of 52 available subcarriers. A 64-point IFFT may then be applied to the sequence resulting in a 3.2 μs sequence with a pattern that repeats four times (i.e., with 0.8 μs periodicity). The sequence may be repeated two and a half times to create the ten short symbol repetitions. Wi-Fi devices may use the repetitive nature of the L-STF to correlate a prior symbol with a subsequent symbol (e.g., autocorrelation) and the correlation factor may then be used to detect the Wi-Fi preamble.

For instance, a Wi-Fi device may sample received signals at a 40 MHz sampling frequency. The Wi-Fi device may determine a time shift and accumulation window equal to one L-STF symbol period (e.g., 0.8 μs) for the auto-correlating. When the Wi-Fi device receives a Wi-Fi preamble, auto-correlating the L-STF according to the time shift and accumulation window may yield a high auto-correlation factor (e.g., approximately 1). In some cases, the Wi-Fi device may determine a Wi-Fi preamble has been detected if the auto-correlation factor is greater than a threshold.

The L-LTF may follow the L-STF and may utilize up to 52 subcarriers and may also last 8 μs in time. The L-LTF may employ two 3.2 μs long training symbols prepended by a 1.6 μs cyclic prefix. The cyclic prefix may be comprised of the second half of the long training symbol. The L-LTF may be used for channel reservation and to determine frequency offsets and channel estimates. A Wi-Fi preamble may also include a legacy signal (L-SIG) field that may follow the L-LTF. The L-SIG field may include 24 information bits and may include a 3.2 μs symbol and a 0.8 μs cyclic prefix, lasting a total of 4 μs. The L-SIG field may use 52 subcarriers, 48 of which are for coded bits and 4 of which are for pilot signals. The L-SIG field may be used to configure the receiver by communicating the modulation and coding scheme (MCS) and the length of data to be communicated. The L-SIG field may also include a parity bit and tail bits to flush the encoder and decoder before the data field is decoded. In some cases, additional preamble fields may follow the L-SIG field. For example, newer Wi-Fi features may be supported by a preamble including high throughput (HT) signal fields, HT-SIG 1 and HT-SIG 2 (e.g., 802.11n), or very high throughput (VHT) signal fields, VHT-SIG1 and VHT-SIG 2 (e.g., 802.11ac). These fields may be used to carry additional information related to transmissions using these Wi-Fi technologies.

Before transmitting over a shared channel (e.g., a channel of a shared radio frequency spectrum band), a base station 105 or UE 115 may perform clear channel assessment (CCA) procedures to determine if the shared channel is available. If the base station 105 or UE 115 determines the channel is available, it may transmit an LTE-specific preamble (e.g., a channel usage beacon signal (CUBS), etc.) to reserve the channel. Other LTE-U devices may receive and decode the CUBS while Wi-Fi devices may use energy detection to identify the CUBS. The devices that identify the CUBS transmission may accordingly enter backoff procedures in which they do not contend for access to the medium. In some examples, detection of a CUBS using energy detection may require significantly stronger reception energy at the Wi-Fi device than preamble detection of a Wi-Fi preamble, which may use the properties (e.g., frequency response, periodicity, autocorrelation, etc.) of the Wi-Fi preamble fields described above. Accordingly, an LTE-U device may include a Wi-Fi preamble in a transmitted CUBS (e.g., prior to the CUBS) such that the Wi-Fi preamble is detected by Wi-Fi devices. This may increase the range of the CUBS; however, other LTE-U devices may be unable to differentiate the preamble that is sent from an LTE-U device from a preamble sent from a Wi-Fi device.

Therefore, an LTE-U device, such as UE 115 or base station 105, may transmit an enhanced preamble that may be understood by Wi-Fi devices, such as STA 155 or AP 150, in addition to conveying additional characteristics that are detectable by receiving LTE-U devices. The enhanced preamble may preserve signal properties (e.g., auto-correlation properties) that facilitate detection of the preamble by Wi-Fi devices. The enhanced preamble may also include a characteristic that is indicative of LTE-U. In one example, the characteristic is a phase shift between the first and second training fields of the preamble. The phase shift may be relative to the phases of first and second training fields that are part of preamble signals transmitted by Wi-Fi devices. Additionally or alternatively, the characteristic may be the sequence or tone mapping of the first or second training field. In some cases, the device may introduce an additional training field to the Wi-Fi preamble to serve as the characteristic. The LTE-U device may furthermore transmit the preamble at intervals that coincide with LTE-U timing boundaries.

The modifications may be used to convey LTE-U-specific characteristics to receiving LTE-U devices or Wi-Fi devices while maintaining Wi-Fi specific properties, such as the frequency response or repetitive nature of the L-STF. An LTE-U device may transmit the enhanced preamble, which may be received by both Wi-Fi devices and LTE-U devices. Receiving Wi-Fi and LTE-U devices may detect the enhanced preamble based on the preserved Wi-Fi properties. A receiving LTE-U device or Wi-Fi device may then further process the signal to determine if the received preamble is an enhanced preamble. The receiving device may then use the modifications to determine that an enhanced preamble was transmitted by an LTE-U device, in addition to learning other properties such as the device type or an associated operator (e.g., public land mobile network (PLMN) etc.). In some cases, the LTE-U device or Wi-Fi device may use a determination of a transmission type (e.g., a determination of a protocol used by a device transmitting the preamble, etc.) to take various steps in response to the determination. For example, a Wi-Fi device may determine that a received preamble was transmitted by an LTE-U device, and use the determination to avoid further processing of communications from the LTE-U device or perform interference cancellation.

Figure 2:
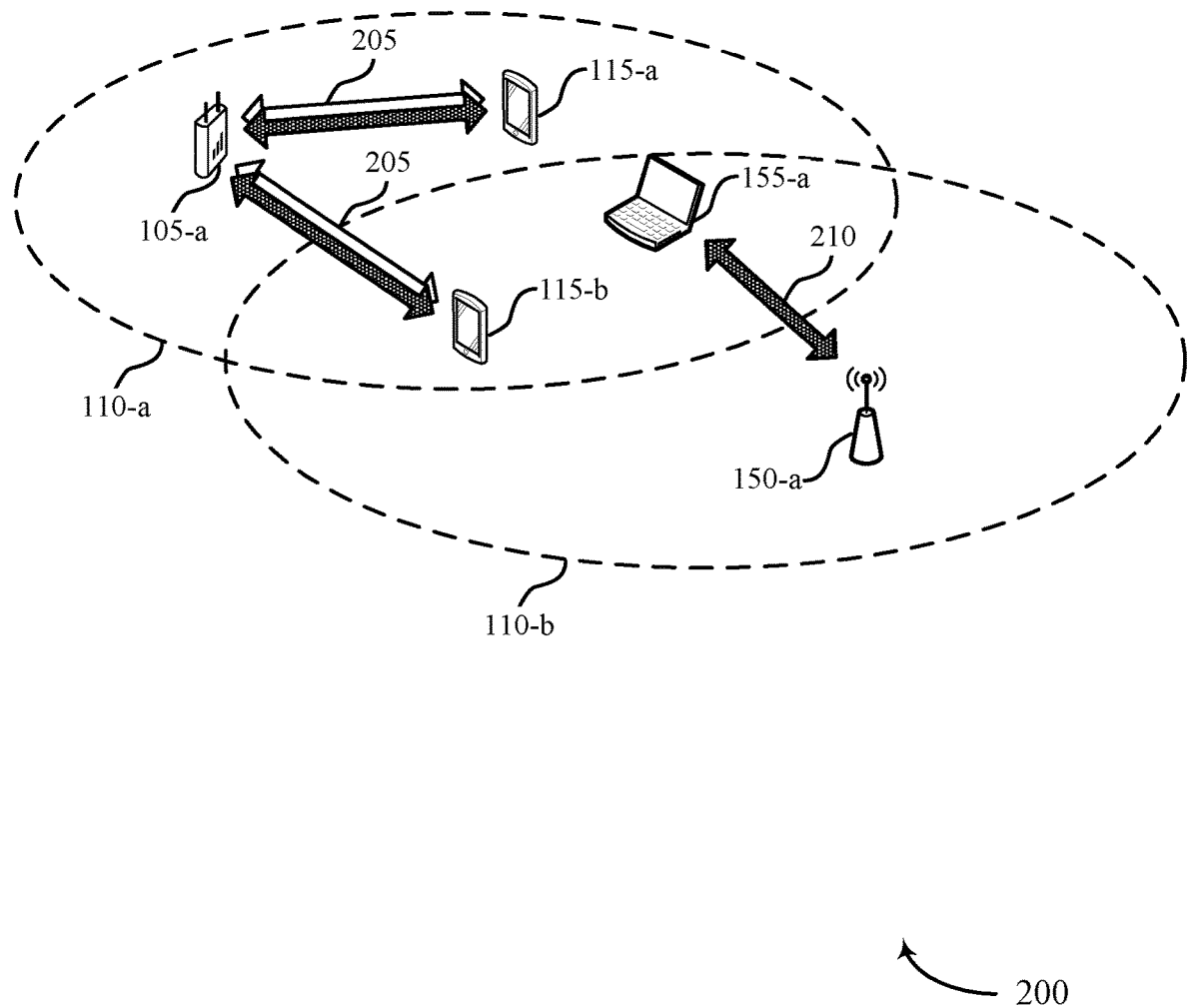
FIG. 2 illustrates an example of a wireless communications subsystem that supports an enhanced preamble waveform for coexistence in accordance with various aspects of the present disclosure.

FIG. 2 illustrates an example of a wireless communication environment 200 for coexistence in accordance with various aspects of the present disclosure. Base station 105-a, UE 115-a, and UE 115-b may communicate with one another using dedicated spectrum (e.g., licensed spectrum), the shared spectrum (e.g., unlicensed spectrum), or both via communication links 205. AP 150-a and STA 155-a may communicate with one another using the shared spectrum via WLAN communication links 210. In one example, UE 115-a, UE 115-b, and base station 105-a may be LTE-U capable devices and STA 155-a, STA 155-b, and AP 150-a may be Wi-Fi devices, as described above with reference to FIG. 1.

In one example, UE 115-a may perform a CCA to determine if the shared spectrum is available for transmissions. After a successful CCA, UE 115-a may generate an enhanced Wi-Fi preamble that includes a number of training fields (e.g., a short training field and a long training field). UE 115-a may generate the enhanced preamble using a number of techniques. For instance, UE 115-a may generate the enhanced preamble with a phase shift between the short training field and the long training field. Additionally or alternatively, UE 115-a may generate the enhanced preamble with a sequence and/or tone mapping of the short (or long training field) that is indicative of LTE-U. In some cases, UE 115-a may generate an additional training field (e.g., a third training field) that is included in the enhanced Wi-Fi preamble. UE 115-a may also align a Wi-Fi timing boundary (e.g., beginning or end of the L-STF, L-LTF, or L-SIG field) with an LTE-U timing boundary (e.g., a symbol, subframe, frame boundary, etc.). Each of these characteristics may convey LTE-U-specific information (e.g., device type, operator, etc.) in addition to distinguishing the enhanced preamble from the Wi-Fi preamble. After generating the enhanced preamble, UE 115-a may transmit the enhanced preamble over the shared spectrum.

Wi-Fi devices, such as AP 150-a and STA 155-a, may receive and detect the enhanced preamble. For example, Wi-Fi devices may detect the enhanced preamble using the same techniques (e.g., autocorrelation or cross correlation) used to detect a Wi-Fi preamble because the signal properties of the enhanced preamble detected by these operations may be consistent with a Wi-Fi preamble. The Wi-Fi devices may adjust their operations accordingly. For example, the Wi-Fi devices may enter a backoff period or otherwise cease contention procedures for the shared medium. LTE-U devices, UE 115-b, and base station 105-a, may similarly receive and detect the enhanced preamble. The LTE-U devices may then further process the enhanced preamble to detect the characteristic identifying the enhanced preamble as being transmitted by an LTE-U device. The receiving LTE-U devices may use the characteristic to determine that the received Wi-Fi preamble is, in fact, an enhanced Wi-Fi preamble and that the preamble was transmitted from another LTE-U device (e.g., UE 115-a). The receiving LTE-U devices may additionally use the characteristic to determine other LTE-U specific information associated with the transmitting device, such as device type, operator, carrier information, device identification, and the like. Some Wi-Fi devices may be configured to detect the characteristic to determine that a received preamble was transmitted by an LTE-U device, and use the determination to, for example, avoid further processing of the transmission or perform interference cancellation.

Figure 3A:
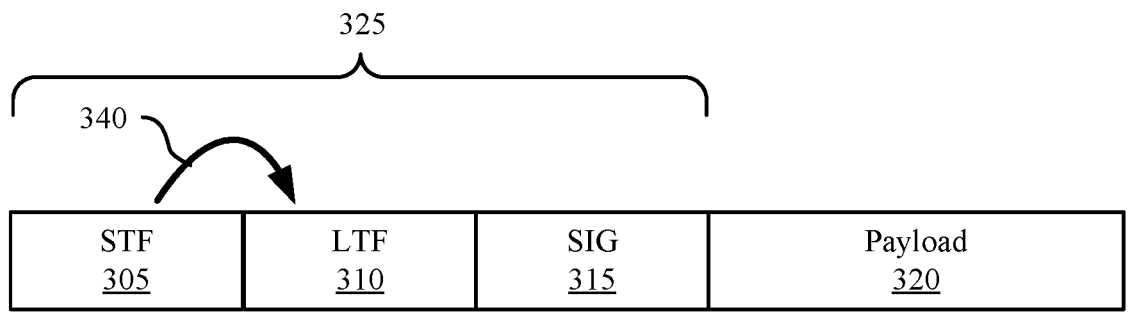
FIGS. 3A-3C illustrate an example of an enhanced preamble for coexistence in accordance with various aspects of the present disclosure.

FIG. 3A illustrates an example of an enhanced transmission 300-a for coexistence in accordance with various aspects of the present disclosure. Enhanced packet transmission 300-a may illustrate aspects of a transmission between a UE 115 and a base station 105, as described above with reference to FIGS. 1-2. Enhanced packet transmission 300-a may include an enhanced preamble 325 and a payload 320. The enhanced preamble 325 may include a short training field (STF) 305, a long training field (LTF) 310, and a signal (SIG) field 315. In some cases, the enhanced preamble may include additional STF, LTF, and SIG fields that are subsequent to STF 305, LTF 310, and SIG field 315. For instance, a high throughput preamble may include HT-STF, HT-LTF, and HT-SIG fields (e.g., 802.11n).

In one example, an LTE-U device, such as a UE 115 or a base station 105, may generate fields of a WLAN preamble to obtain enhanced preamble 325. In some cases, the UE 115 may generate the enhanced preamble 325 by generating a phase shift 340 between the STF 305 and the LTF 310. The UE 115 may shift the STF 305 in relation to the LTF 310, or vice versa. In some cases, the phase shift 340 may be a 180 degree shift, although other phase shifts (e.g., 45, 90, 135, etc.) may also be used. The UE 115 may transmit the enhanced packet transmission 300-a, including enhanced preamble 325. Other LTE-U devices and WLAN devices, such as a STAs 155 or an APs 150, may receive and identify the enhanced packet transmission 300-a as a WLAN packet transmission. Since applying the phase shift 340 does not affect the STF carrier spacing or the repetitive nature of the STF (e.g., the autocorrelation properties of the enhance preamble are preserved), WLAN devices may continue to use WLAN preamble detection techniques (e.g., the auto-correlation techniques described in FIG. 1, etc.) that may identify the enhanced packet transmission 300-a as a WLAN packet transmission.

The LTE-U devices, however, may additionally detect the phase shift 340 between STF 305 and LTF 310, and determine that the enhanced packet transmission 300-a includes an enhanced preamble 325. The LTE-U device may accordingly determine that the enhanced packet transmission 300-a was transmitted by an LTE-U device. The LTE-U device may additionally determine LTE-U specific characteristics by identifying varying degrees of phase shifts between STF 305 and LTF 310. Each phase shift may correspond to an LTE-U property such as a device type, the operator, carrier information (e.g., if a transmission uses an enhanced component carrier (eCC), etc.), and the like. For instance, a phase shift of a certain value (e.g., 45 degrees) may correspond to a transmission from an LTE-U capable UE 115, while a different phase shift (e.g., 90 degrees) may indicate a transmission from a base station 105.

Figure 3B:
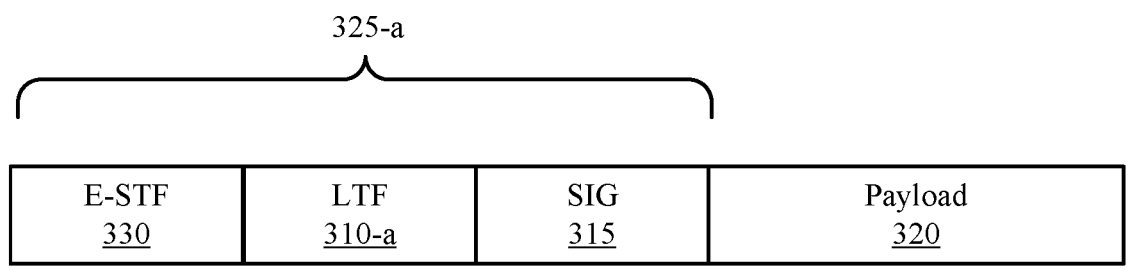

FIG. 3B illustrates an example of an enhanced packet transmission 300-b for coexistence in accordance with various aspects of the present disclosure. Enhanced packet transmission 300-b may illustrate aspects of a transmission between a UE 115 and a base station 105, as described above with reference to FIGS. 1-2. Enhanced packet transmission 300-b may include an enhanced preamble 325-a and a payload 320. The enhanced preamble 325-a may include an enhanced STF (E-STF) 330, an LTF 310-a, and a SIG field 315. In some cases, the enhanced preamble may include additional STF, LTF, and SIG fields that are subsequent to STF 305, LTF 310, and SIG field 315.

In one example, an LTE-U device, such as a UE 115 or a base station 105, may generate fields of a WLAN preamble to obtain enhanced preamble 325-a. As discussed above, an STF field may be generated by mapping a frequency domain sequence to a subset of sub-carriers and converted to the time domain using an N-point IFFT. The E-STF 330 may be generated by selecting a frequency domain sequence or sub-carrier mapping that is indicative of LTE-U. The frequency domain sequence or sub-carrier mapping may be indicative of LTE-U by virtue of the fact that different frequency domain sequences and sub-carrier mappings are used for legacy preambles (e.g., preambles transmitted by Wi-Fi devices). For example, the sub-carrier mapping may use similar sub-carrier spacing between mapped symbols, but may have a frequency (e.g., sub-carrier) offset. The frequency domain sequence may be modified with respect to legacy sequences by inverting symbols of the sequence with respect to the legacy sequence, cyclically shifting the sequence with respect to the legacy sequence, or other techniques that may preserve some frequency or time domain properties of the legacy sequence.

UE 115 may apply the enhanced frequency domain sequences or sub-carrier mappings to E-STF 330 to obtain enhanced preamble 325-a. The UE 115 may use unique sequences and tone mappings to convey LTE-U-specific characteristics. The frequency domain sequences may, when transformed to the time domain using the N-point IFFT, maintain various properties of the L-STF. For example, the modified frequency domain sequence may generate a time domain sequence that includes 10 symbol repetitions each with a periodicity of 0.8 μs. Thus, various detection techniques used by WLAN devices to detect a WLAN preamble may also detect the E-STF (e.g., auto-correlation, cross-correlation, frequency domain energy detection, etc.).

The UE 115 may transmit the enhanced packet transmission 300-b, including enhanced preamble 325-a. Other LTE-U devices and WLAN devices, such as a STA 155 or an AP 150, may receive and identify the enhanced packet transmission 300-b as a WLAN packet transmission using the above detection techniques. The LTE-U devices, however, may additionally detect the enhanced sequence or tone mapping and determine that the enhanced packet transmission 300-b includes an enhanced preamble 325-a. The LTE-U device may accordingly determine that the enhanced packet transmission 300-b was transmitted by an LTE-U device and may identify additional LTE-U specific characteristics. For instance, a certain sequence may correspond to a transmission from a UE 115, a certain tone mapping may correspond to a transmission from a base station 105, a certain combination of a tone mapping and a sequence may correspond to an eCC, and the like. Additionally or alternatively, similar techniques may be applied to the LTF 310-a. In some examples, the E-STF 330 may be phase shifted with respect to the LTF 310-a in addition to the modified sequence or tone mapping as described above with respect to FIG. 3A.

Figure 3C:
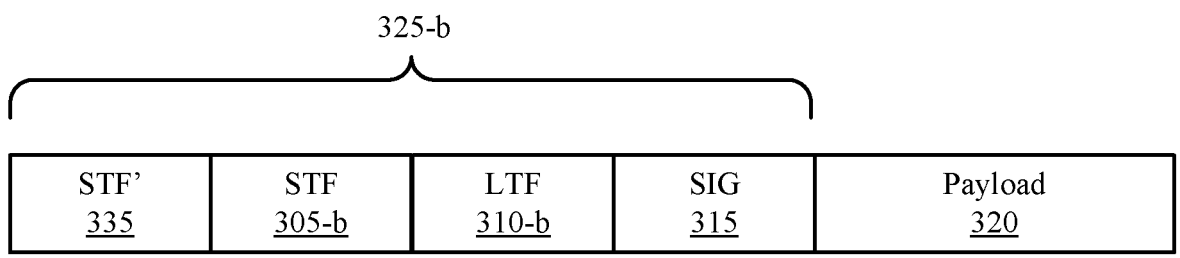

FIG. 3C illustrates an example of an enhanced packet transmission 300-c for coexistence in accordance with various aspects of the present disclosure. Enhanced packet transmission 300-c may illustrate aspects of a transmission between a UE 115 and a base station 105, as described above with reference to FIGS. 1-2. Enhanced packet transmission 300-c may include an enhanced preamble 325-b and a payload 320. The enhanced preamble 325 may include an additional STF (STF' 335), an STF 305-b, an LTF 310-b, and a SIG field 315. In some cases, the enhanced preamble may include additional STF, LTF, and SIG fields that are subsequent to STF 305, LTF 310, and SIG field 315.

In one example, an LTE-U device, such as a UE 115 or a base station 105, may generate a WLAN preamble to obtain enhanced preamble 325-*b*. In some cases, the UE 115 may generate the WLAN packet by adding STF' 335 to the WLAN packet to obtain enhanced preamble 325-*b*. STF' 335 may include a similar time repetition sequence to the STF waveform. However, the UE 115 may invert the STF waveform at an interval that is less than or equal to half of the STF waveform's period to obtain STF' 335. For instance, the UE 115 may invert the STF waveform every 0.4 µs. Therefore, a WLAN device that auto-correlates a preamble according to 0.8 µs symbol periods may see little energy during STF' 335. The UE 115 may transmit the enhanced packet transmission 300-*c*, including enhanced preamble 325-*b*. Other LTE-U devices and WLAN devices, such as a STA 155 or an AP 150, may receive and identify the enhanced packet transmission 300-*c* as a WLAN packet. Since the STF 305-*b* and LTF 310-*b* may be unchanged and STF' 335 undetectable to WLAN devices, the WLAN device may detect the WLAN preamble WLAN devices may continue to use WLAN preamble detection techniques (e.g., auto-correlation, etc.) that may identify the enhanced packet transmission 300-*a* as a WLAN packet transmission. The LTE-U devices, however, may additionally search for and detect the STF' 335 and determine that the enhanced packet transmission 300-*c* includes an enhanced preamble 325-*b*. The LTE-U device may accordingly determine that the enhanced packet transmission 300-*c* was transmitted by an LTE-U device and may additionally determine additional LTE-U specific characteristics. For instance, STF' 335 may be transmitted with varying degrees of phase shift with reference to one or both of the subsequent training fields, STF 305-*b* or LTF 310-*b*, to communicate LTE-U specific characteristics as described above with reference to FIG. 3A. Furthermore, unique sequences and tone mappings may be applied to STF' 335 to communicate LTE-U specific characteristics as described above with reference to FIG. 3B.

The techniques used to generate enhanced packet transmission 300-*a*, 300-*b*, and 300-*c* may be used alone or in combination to generate an enhanced packet. For instance, a phase shift, such as phase shift 340 shown in FIG. 3A, may be applied to E-STF 330 of FIG. 3B with respect to another preamble field such as the LTF 310-*a*. The phase shift may also be applied to the STF' 335 of FIG. 3C with respect to another preamble field, such as STF 305-*b* or LTF 310-*b*. Similarly, the unique sequence or tone mappings, such as those used to generate E-STF 330, may be applied to the STF' 335. In another instance, an additional preamble field, such as STF' 335, may be applied to the enhanced preambles 325 or 325-*a*. For example, the enhanced preamble 325 may have an additional preamble field while maintaining the phase shift 340 between STF 305 and LTF 310. Similarly, enhanced preamble 325-*a* may have an additional preamble field in addition to the modifications used to generate E-STF 330. In some examples, different techniques (e.g., phase shifts, sequence or tone mappings, additional preamble fields, etc.) may be associated with different characteristics of the LTE-U transmitter. Additionally or alternatively, combining these techniques may increase detectability or provide redundancy for detecting the LTE-U characteristics. Therefore, while specific examples are provided for illustration, the techniques for preamble generation discussed with respect to FIG. 3A, FIG. 3B, or FIG. 3C may be used in any combination to convey the same or different information or characteristics associated with a transmitting entity.

Although detection of the characteristic is discussed with reference to FIGS. 3A-3C as performed by an LTE-U device, detection of the characteristic maybe performed by a WLAN device. For example, a Wi-Fi device may determine that a received enhanced preamble was transmitted by an LTE-U device, and use the determination to avoid further processing of the associated transmission from the LTE-U device or perform interference cancellation.

Figure 4:
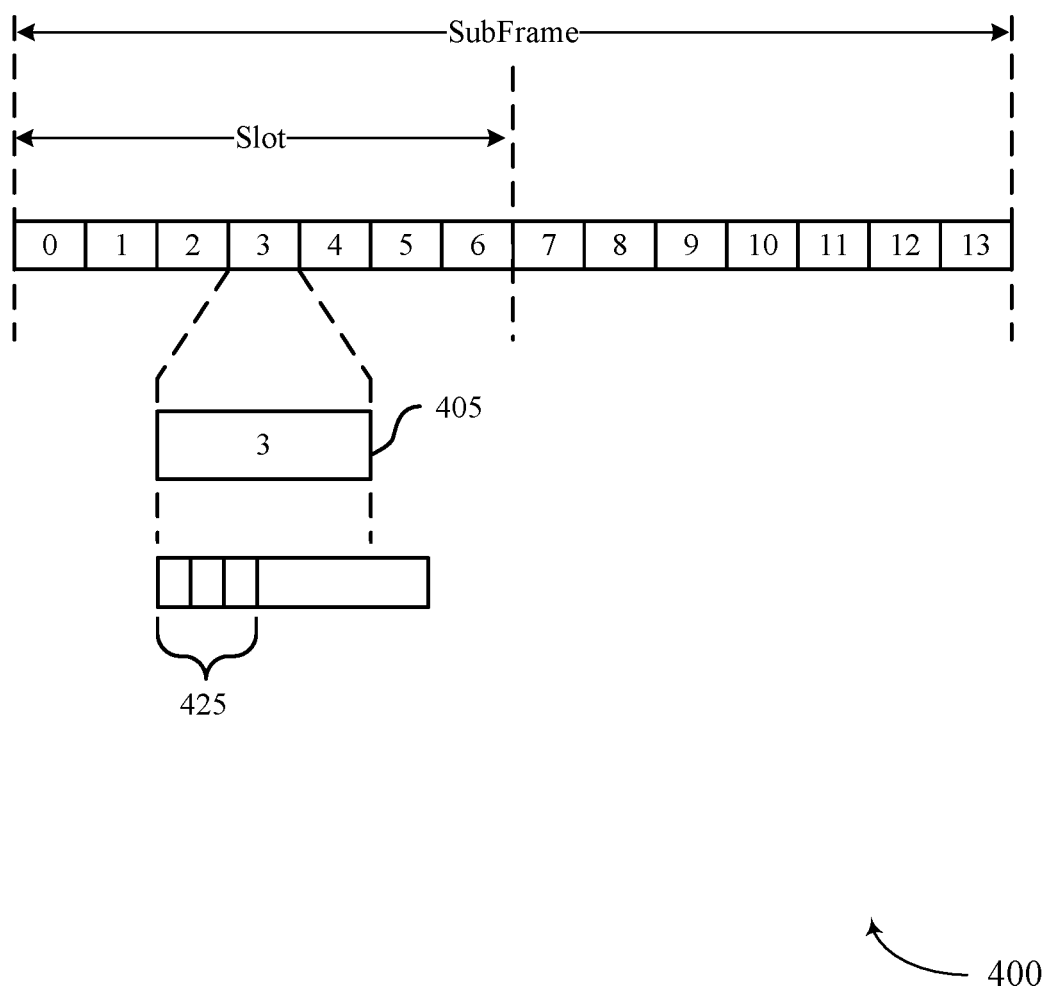
FIG. 4 illustrates an example of a transmission timing for an enhanced preamble for coexistence in accordance with various aspects of the present disclosure.

FIG. 4 illustrates an example of a transmission timing 400 for coexistence in accordance with various aspects of the present disclosure. Transmission timing 400 may illustrate aspects of a transmission of an enhanced preamble from a UE 115. An LTE-U timing structure may include frames, subframes, and symbols 405. A frame may include ten subframes, a subframe may include two slots, and a slot may include of 6 or 7 symbols. A symbol 405 period may be approximately 67 µs. WLAN symbols may be transmitted with significantly shorter periods (e.g., 0.8 µs), and a WLAN preamble 425 including an 8 µs STF, 8 µs LTF, and 4 µs SIG field may be 20 µs in time. WLAN preamble 425 may be an example of enhanced preamble, 325-*a*, 325-*b*, or 325-*c* with reference to FIGS. 3A-3C.

Accordingly, a WLAN preamble 425 may be transmitted within an LTE-U symbol 405 period. Therefore, an LTE-U device, such as UE 115 or base station 105, may align the beginning or end of fields of WLAN preamble 425 with a symbol, slot, subframe, or frame boundary of the LTE/LTE-U network. In some cases, UE 115 may align the beginning or end of an STF, LTF, or SIG field with an LTE/LTE-U timing boundary. UE 115 may transmit the aligned WLAN preamble 425. Other LTE-U devices and WLAN devices, such as a STA 155 or an AP 150, may receive the WLAN packet as described above with reference to FIGS. 3A-3B. The other LTE-U devices may detect that the WLAN preamble 425 is aligned with an LTE-U timing boundary. The LTE-U devices may use the alignment to determine that the WLAN packet was transmitted by an LTE-U device. In some cases, the alignment of the enhanced preamble may convey additional LTE-U characteristics. For instance, a device may determine an LTE-U characteristic based on which preamble field corresponds to an LTE-U timing boundary. In one example, an alignment between the beginning of the LTF and the LTE symbol period may correspond to a transmission from an LTE-U capable UE 115.

As described above, the enhanced preambles of FIGS. 3A-3C may be used alone or in combination to generate an enhanced preamble. Each of these techniques, and each combination of these techniques, may similarly be combined with the alignment techniques used for an enhanced WLAN preamble 425. For instance, the beginning or end of a preamble field of an enhanced packet, such as enhanced preambles 325, 325-*a*, or 325-*b*, may be aligned with an LTE/LTE-U timing boundary, and different alignments may convey the same or different information or characteristics associated with a transmitting entity.

Figure 5:
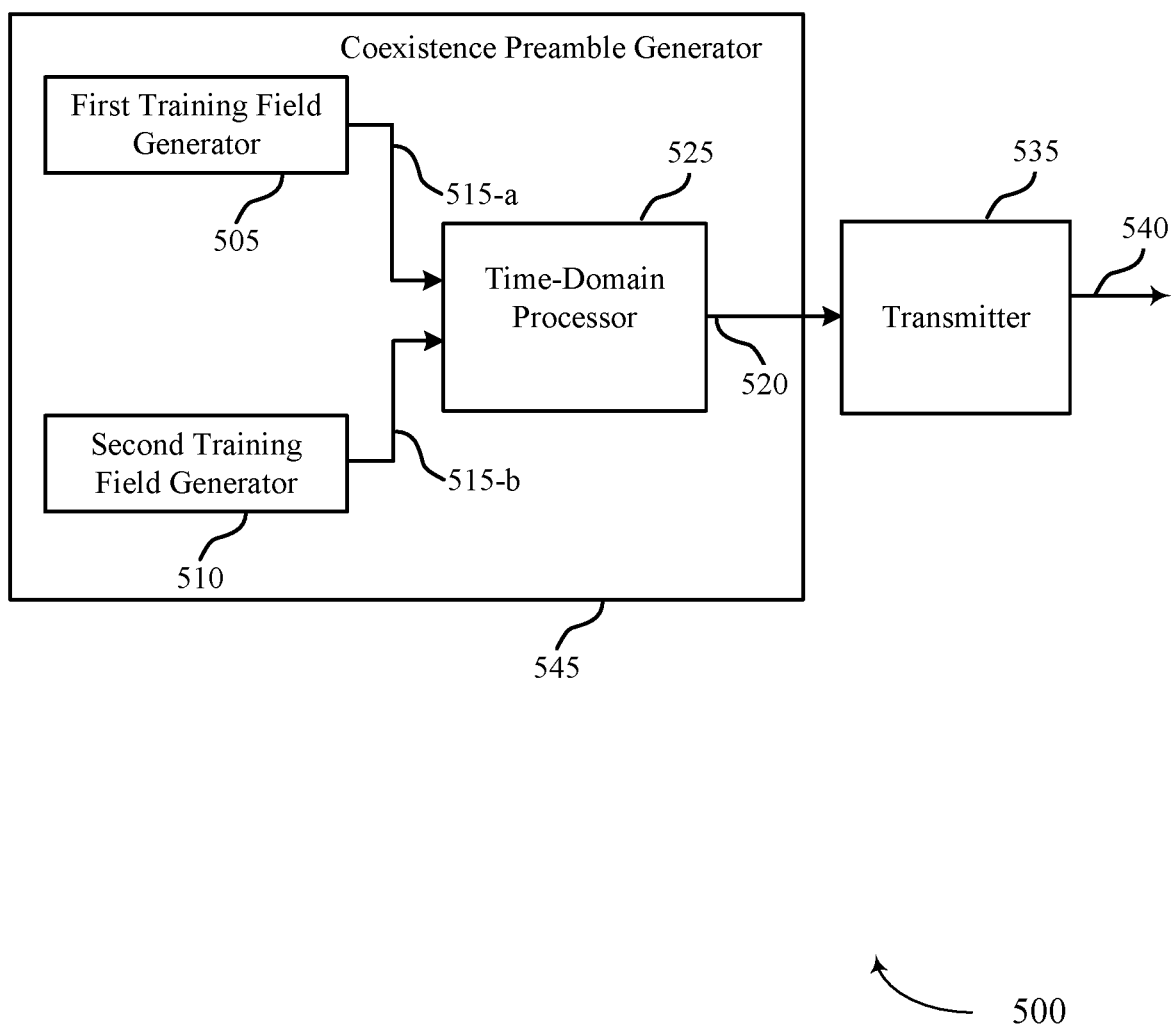
FIG. 5 shows a block diagram of a wireless device that supports an enhanced preamble waveform for coexistence in accordance with various aspects of the present disclosure.

FIG. 5 shows a block diagram of a wireless device 500 configured for an enhanced preamble waveform for coexistence in accordance with various aspects of the present disclosure. Wireless device 500 may be an example of aspects of a device, such as a UE 115, STA 155, or base station 105, described with reference to FIGS. 1-4. Wireless device 500 may include a coexistence preamble generator 545, a time-domain processor 525, and a transmitter 535.

Wireless device 500 may also include a processor. Each of these components may be in communication with each other. Wireless device 500 may support communications over licensed and unlicensed spectrum. Wireless device 500 may operate in an environment in which one or more devices communicate using a first RAT (e.g., Wi-Fi) and/or a second RAT (e.g., LTE-U).

The coexistence preamble generator 545 may include a first training field generator 505 and a second training field generator 510. The first training field generator 505 may generate a first training field (e.g., an STF) for a preamble signal. The first training field generator 505 may pass a first training field signal 515-$a$ to time-domain processor 525. The second training field generator 510 may generate a second training field (e.g., an LTF) for the preamble signal. Thus, the second training field generator 510 may pass a second training field signal 515-$b$ to time-domain processor 525. The first and/or second training field may have a signal property that is associated with detection by devices employing the first RAT. The first and/or second training field may also convey at least one characteristic that is associated with the second RAT. The time-domain processor 525 may perform time domain processing, such as combining and/or filtering of the first and second training field signals to generate an enhanced preamble as described herein.

The transmitter 535 may receive output signals 520 and transmit an enhanced preamble waveform 540. Enhanced preamble waveform 540 may include an enhanced preamble, (derived from output signals 520) and a payload. In some examples, the transmitter 535 may be collocated with a receiver in a transceiver module. The transmitter 535 may include a single antenna, or it may include a plurality of antennas. In some examples, the transmitter 535 may transmit the enhanced preamble waveform 540 over a frequency channel shared by the second RAT.

Figure 6:
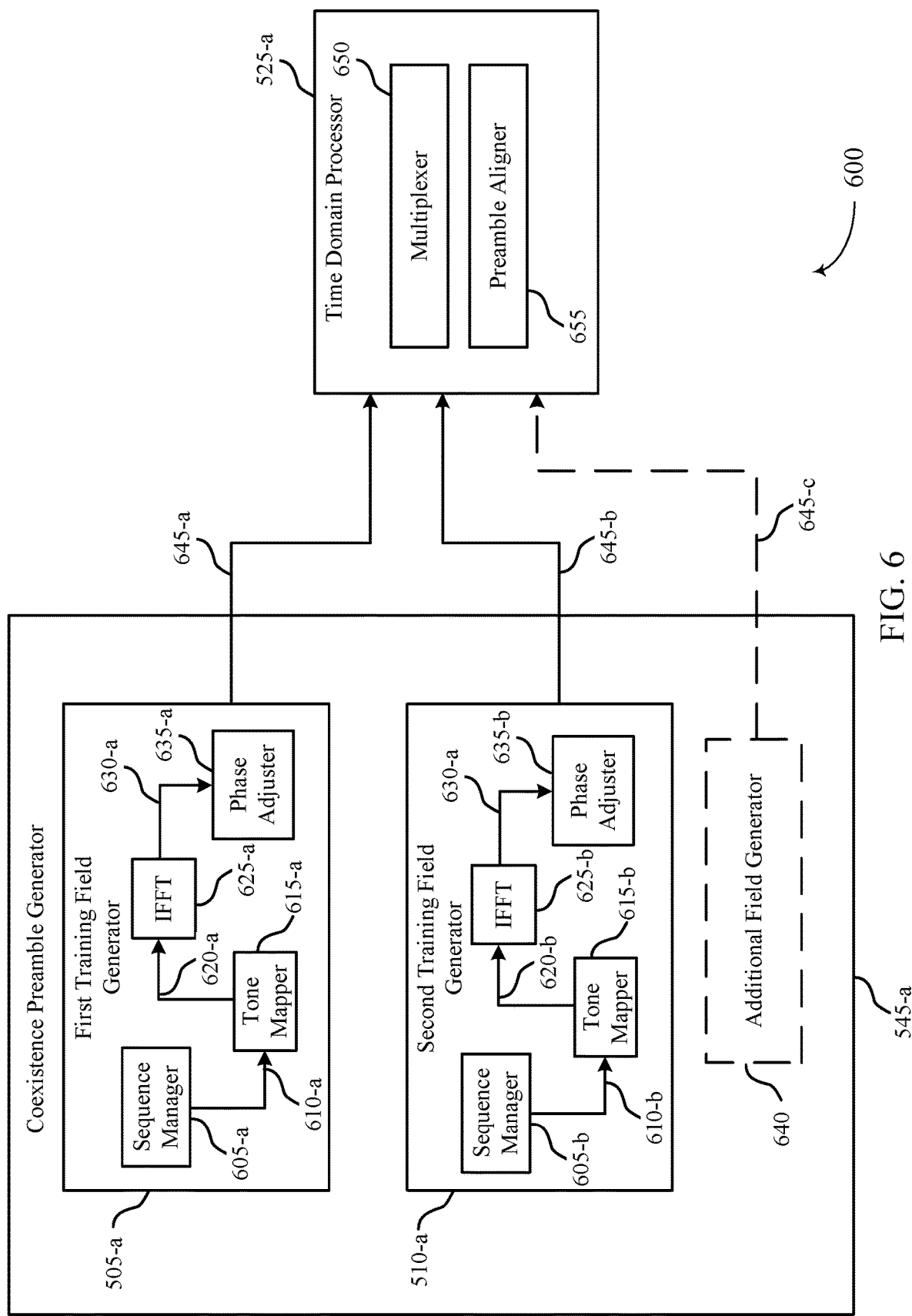
FIG. 6 shows a block diagram of a wireless device that supports an enhanced preamble waveform for coexistence in accordance with various aspects of the present disclosure.

FIG. 6 shows a block diagram of a wireless device 600 for an enhanced preamble waveform for coexistence in accordance with various aspects of the present disclosure. Wireless device 600 may be an example of aspects of a wireless device 500 or a device, such as a UE 115 or base station 105, described with reference to FIGS. 1-5. Wireless device 500 may operate in an environment in which one or more devices communicate using a first RAT (e.g., Wi-Fi) and/or a second RAT (e.g., LTE-U). Wireless device 600 may include first training field generator 505-$a$, second training field generator 510-$a$, an additional field generator 640, and time-domain processor 525-$a$. Wireless device 600 may also include a processor. Each of these components may be in communication with each other.

First training field generator 505-$a$ may be an example of a first training field generator 505 described with reference to FIG. 5 and second training field generator 510-$a$ may be an example of a second training field generator 510. First training field generator 505-$a$ may generate a first training field signal 645-$a$ (e.g., an STF or LTF) for an enhanced preamble and second training field generator 510-$a$ may generate a second training field signal 645-$b$ (e.g., an STF or LTF). First training field generator 505-$a$ and second training field generator 510-$a$ may each include a sequence manager 605, a tone mapper 615, an IFFT 625, and a phase adjuster 635.

Sequence manager 605-$a$ may select a first sequence (e.g., a frequency domain sequence) for the first training field and sequence manager 605-$b$ may select a second sequence for the second training field. In some examples, one or both of the sequences may be associated with the second RAT. Sequence managers 605 may select each respective sequence so that sequence properties associated with detection by devices employing the first RAT are preserved. Each sequence manager 605 may pass its respective selected sequence 610-$b$ to tone mapper 615. Tone mapper 615-$a$ may map the selected first sequence to a first set of tones and tone mapper 615-$a$ may map the selected second sequence to a second set of tones. Tone mappers 615 may select each set of tones so that tonal properties associated with detection by devices employing the first RAT are preserved. The first and/or second set of tones may be associated with the second RAT. The frequency domain sequence or sub-carrier mapping may be indicative of the second RAT by virtue of the fact that different frequency domain sequences and sub-carrier mappings are used for legacy preambles (e.g., preambles transmitted by Wi-Fi devices). For example, the sub-carrier mapping may use similar sub-carrier spacing between mapped symbols, but may have a frequency (e.g., sub-carrier) offset. The frequency domain sequence may be modified with respect to un-enhanced sequences by inverting symbols of the sequence with respect to the unenhanced sequence, cyclically shifting the sequence with respect to the unenhanced sequence, or other techniques that may preserve some frequency or time domain properties of the un-enhanced sequence.

After mapping the sequences to sets of tones, each tone mapper 615 may pass the mapped sequences 620-$a$ to IFFT 625. IFFT 625-$a$ may convert the first mapped sequence into the time domain (e.g., using an N-point IFFT) and IFFT 625-$b$ may convert the second mapped sequence into the time domain (e.g., using an N-point IFFT). The converted time domain training field signals 630-$a$ may be passed from each IFFT 625 to a corresponding phase adjuster 635. Phase adjuster 635-$a$ may adjust the phase for the first time domain training field signal and phase adjuster 635-$b$ may adjust the phase for the second time domain training field signal. In some cases, the phase for the first and second time domain training field signals may be adjusted so that they are offset from one another in a way that is indicative of the second RAT. Phase adjusters 635 may adjust the phases so that phase properties associated with detection by devices employing the first RAT are preserved. Although shown with a particular configuration in FIG. 6, the components of the first training field generators may be rearranged and/or removed in accordance with various aspects of the present disclosure.

First training field generator 505-$a$ may pass the first training field signal 645-$a$ to time-domain processor 525-$a$ and second training field generator 510-$a$ may pass the second training field signal 645-$b$ to time-domain processor 525-$a$. In some cases, a third training field signal 645-$c$ may be passed from additional field generator 640 to time-domain processor 525-$a$. The third training field signal 645-$c$ may be indicative of the second RAT and may be generated in a similar manner to the first and second training field signals 645-$a$, 645-$b$. The third training field signal 645-$c$ may have an inverted sign at intervals that are less than or equal to one half of a symbol period associated with the first training field signal. Time-domain processor 525-$a$ may multiplex the training field signals 645 into a preamble signal using multiplexer 650. In some cases, time-domain processor 525-$a$ may align (e.g., via preamble aligner 655) the beginning or end of one of the training fields of the preamble signal with at least one of a symbol period, a subframe period, or a frame period associated with the second RAT.

Thus, the wireless device 600 may generate a plurality of training fields of a preamble signal. The preamble signal may convey at least one characteristic that is associated with the second RAT. One or more of the training fields may have a signal property that is associated with detection by devices employing the first RAT.

Figure 7:
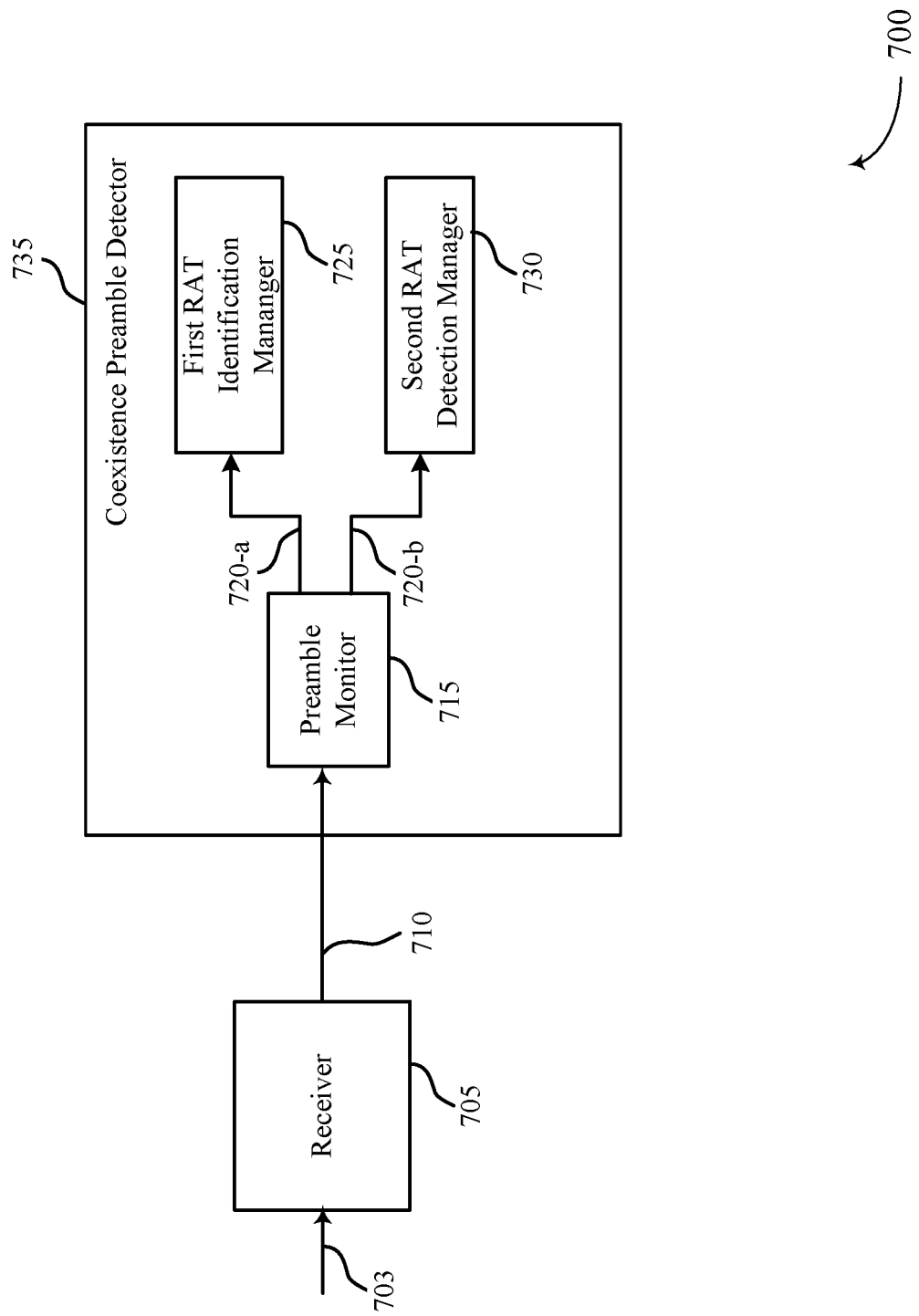
FIG. 7 shows a block diagram of a wireless device that supports an enhanced preamble waveform for coexistence in accordance with various aspects of the present disclosure.

FIG. 7 shows a block diagram of a wireless device 700 configured for enhanced preamble waveform processing for shared-channel coexistence in accordance with various aspects of the present disclosure. Wireless device 700 may be an example of aspects of a device, such as a UE 115, STA 155, base station 105, wireless device 500, or wireless device 500 described with reference to FIGS. 1-6. Wireless device 700 may include a receiver 705 and a coexistence preamble detector 735. Wireless device 700 may also include a processor. Coexistence preamble detector 735 may include a preamble monitor 715, a first RAT identification manager 725, and a second RAT detection manager 730. Each of these components may be in communication with each other. Wireless device 700 may support communications over licensed, unlicensed, and/or shared spectrum. Wireless device 700 may operate in an environment in which one or more devices communicate using a first RAT (e.g., Wi-Fi) and/or a second RAT (e.g., LTE-U).

The receiver 705 may receive signals 703 that may include information such as packets, user data, or control information associated with various information channels (e.g., control channels, data channels, and information related to an enhanced preamble waveform for coexistence, etc.). In some examples, the receiver 705 may receive a preamble signal over a frequency channel shared by the first RAT and the second RAT. The preamble signal may include a number of training fields (e.g., a first training field, such as an STF, and a second training field, such as an LTF). The preamble signal may convey at least one characteristic that is associated with the second RAT. One or more of the training fields may have a signal property that is associated with detection by devices employing the first RAT. The preamble signal 710 may be passed on to the coexistence preamble detector 735 (e.g., to the preamble monitor 715), and to other components of wireless device 700.

The preamble monitor 715 may receive the preamble signal 710 and process it (e.g., demultiplex it) before passing it to the first RAT identification manager 725 and the second RAT detection manager 730. Thus, the first RAT identification manager 725 and the second RAT detection manager 730 may receive processed versions of the preamble signal, represented as processed preamble signals 720. The first RAT identification manager 725 may identify, in the received preamble signal, a signal property that is associated with detection by devices employing the first RAT. The second RAT detection manager 730 may detect at least one characteristic in the preamble signal that is associated with the second RAT. Thus, the wireless device 700 may determine that a device that transmitted the received preamble signal is associated with the second RAT. In some cases, the second RAT detection manager 730 may identify a device type or an operator associated with the transmitter device based at least in part on the characteristic.

Figure 8:
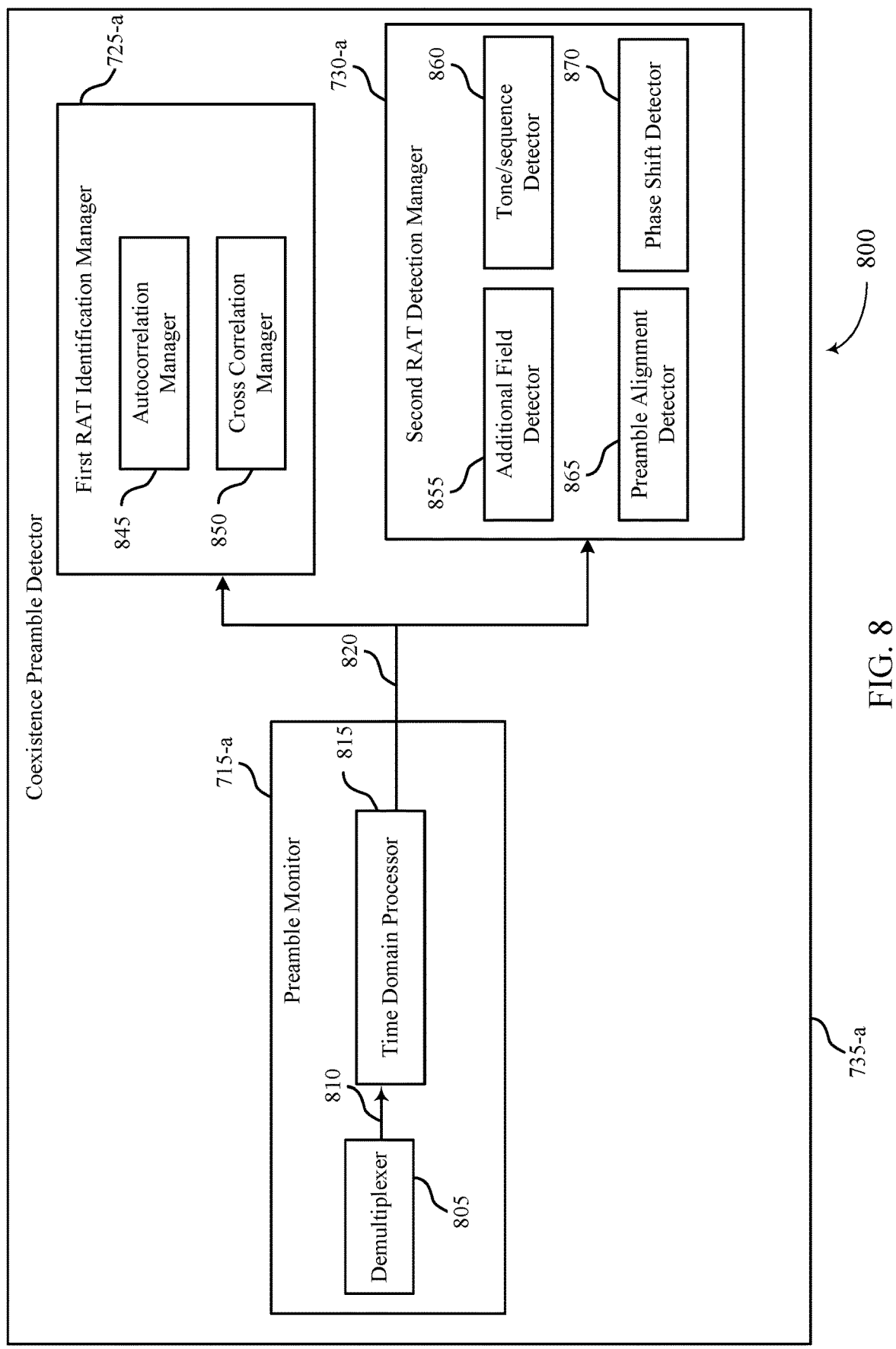
FIG. 8 shows a block diagram of a wireless device that supports an enhanced preamble waveform for coexistence in accordance with various aspects of the present disclosure.

FIG. 8 shows a block diagram of a wireless device 800 for enhanced preamble waveform processing for shared channel coexistence in accordance with various aspects of the present disclosure. Wireless device 800 may be an example of aspects of a wireless device 500, wireless device 600, wireless device 700, or a device, such as a UE 115, STA 155, or base station 105, described with reference to FIGS. 1-7. Wireless device 800 may operate in an environment in which one or more devices communicate using a first RAT (e.g., Wi-Fi) and/or a second RAT (e.g., LTE-U). Wireless device 800 may include preamble monitor 715-*a*, first RAT identification manager 725-*a*, and second RAT detection manager 730-*a*. Wireless device 800 may also include a processor. Each of these components may be in communication with each other.

Preamble monitor 715 may, using demultiplexer 805, demultiplex a received preamble signal (e.g., an enhanced preamble signal that includes a first training field and a second training field). The demultiplexed preamble signal 810 may be passed to the time-domain processor 815, which may further process the preamble signal before passing the processed preamble signal 820 to first RAT identification manager 725-*a* and second RAT detection manager 730-*a*. First RAT identification manager 725-*a* may identify a signal property in the processed preamble signal 820 that is associated with detection by devices employing the first RAT as described herein with reference to FIGS. 1-4. For example, the autocorrelation manager 845 or the cross correlation manager 850 may perform a correlation, or evaluate a correlation, of the preamble signal to detect the preamble signal.

The second RAT detection manager 730-*a* may detect a characteristic in the preamble signal that is associated with the second RAT as described herein with reference to FIGS. 1-4. For example, the tone/sequence detector 860 may identify, in the received preamble signal, a training sequence associated with a first training field and/or a second training field that is identifiable by the second RAT. The tone/sequence detector 860 may additionally or alternatively identify, in the received preamble signal, a modification to a tone mapping associated with the first training field and/or the second training field that is identifiable by the second RAT. In some cases, the additional field detector 855 may identify, in the received preamble signal, a third training field associated with the second RAT. A signal associated with the third training field may be inverted at intervals that are a divisor of a symbol period that is identifiable by the first training field. In some cases, the preamble alignment detector 865 may detect that a beginning and/or end of the preamble signal is aligned with a symbol period associated with the second RAT. Thus, the preamble alignment detector 865 may determine that the transmitter device associated with the received preamble signal is associated with the second RAT by determining the preamble signal is aligned with the symbol period associated with the second RAT. In some examples, the phase shift detector 870 may detect, in the received preamble signal, a phase shift between the first training field and the second training field that is indicative of transmissions by devices associated with the second RAT. Thus, wireless device 800 may determine that a transmitter device associated with the received preamble signal is associated with the second RAT.

The components of wireless device 500, wireless device 600, wireless device 700, or wireless device 800 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 9:
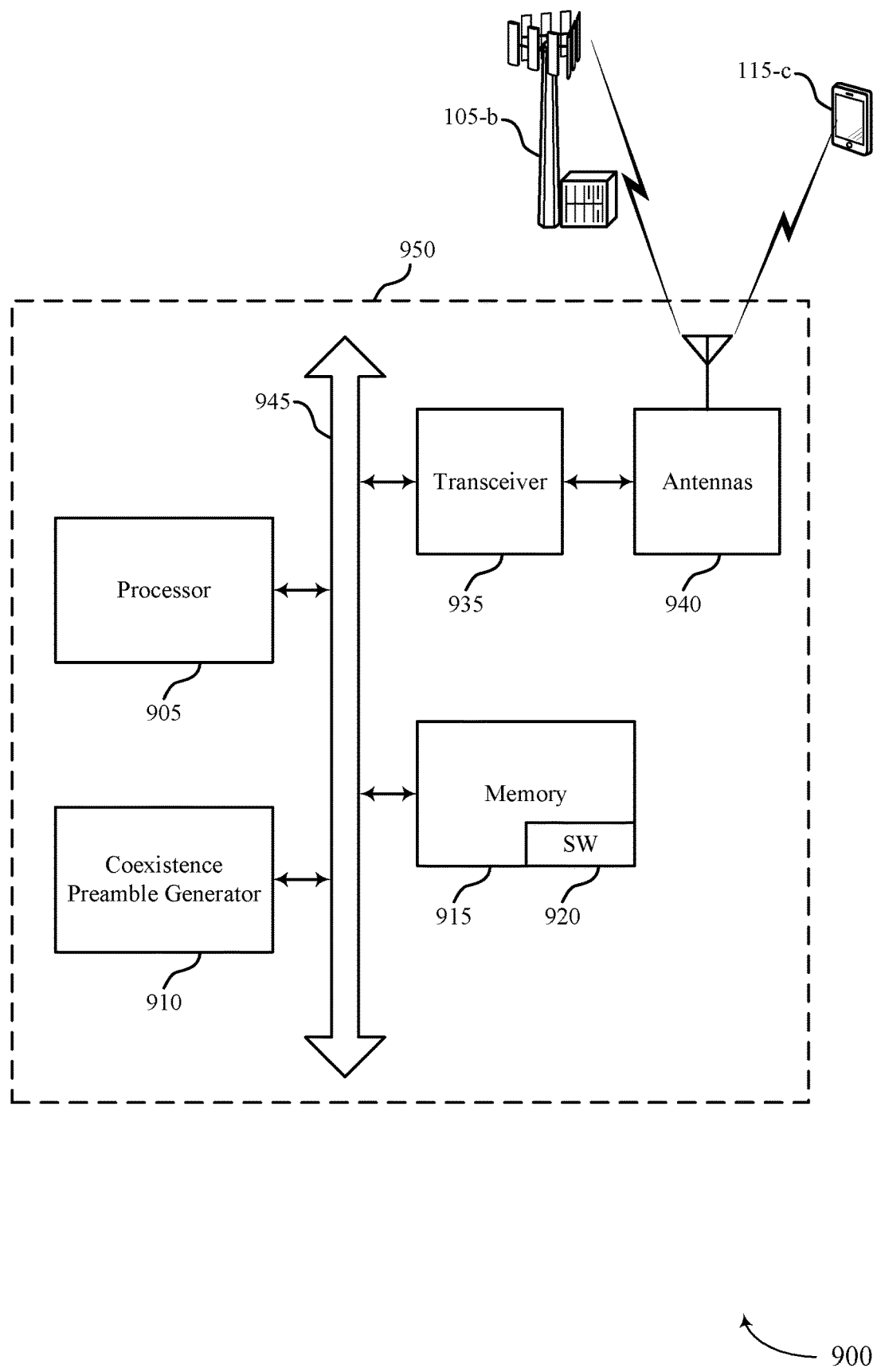
FIG. 9 illustrates a block diagram of a system including a device that supports an enhanced preamble waveform for coexistence in accordance with various aspects of the present disclosure.

FIG. 9 shows a diagram of a system 900 including a UE 115-c configured for an enhanced preamble waveform for coexistence in accordance with various aspects of the present disclosure. System 900 may include a wireless device 950, which may be an example of a wireless device 500, a wireless device 600, a UE 115, or a base station 105 described herein with reference to FIGS. 1, 2, 5, and 6. Wireless device 950 may include a coexistence preamble generator 910, which may be an example of a coexistence preamble generator 545 described with reference to FIGS. 5 and 6. Wireless device 950 may also include components for bi-directional voice and data communications including components for transmitting communications and components for receiving communications. For example, wireless device 950 may communicate bi-directionally with base station 105-b or UE 115-c.

Wireless device 950 may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While wireless device 950 may include a single antenna 940, wireless device 950 may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., generating an enhanced preamble waveform for coexistence, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.).

Figure 10:
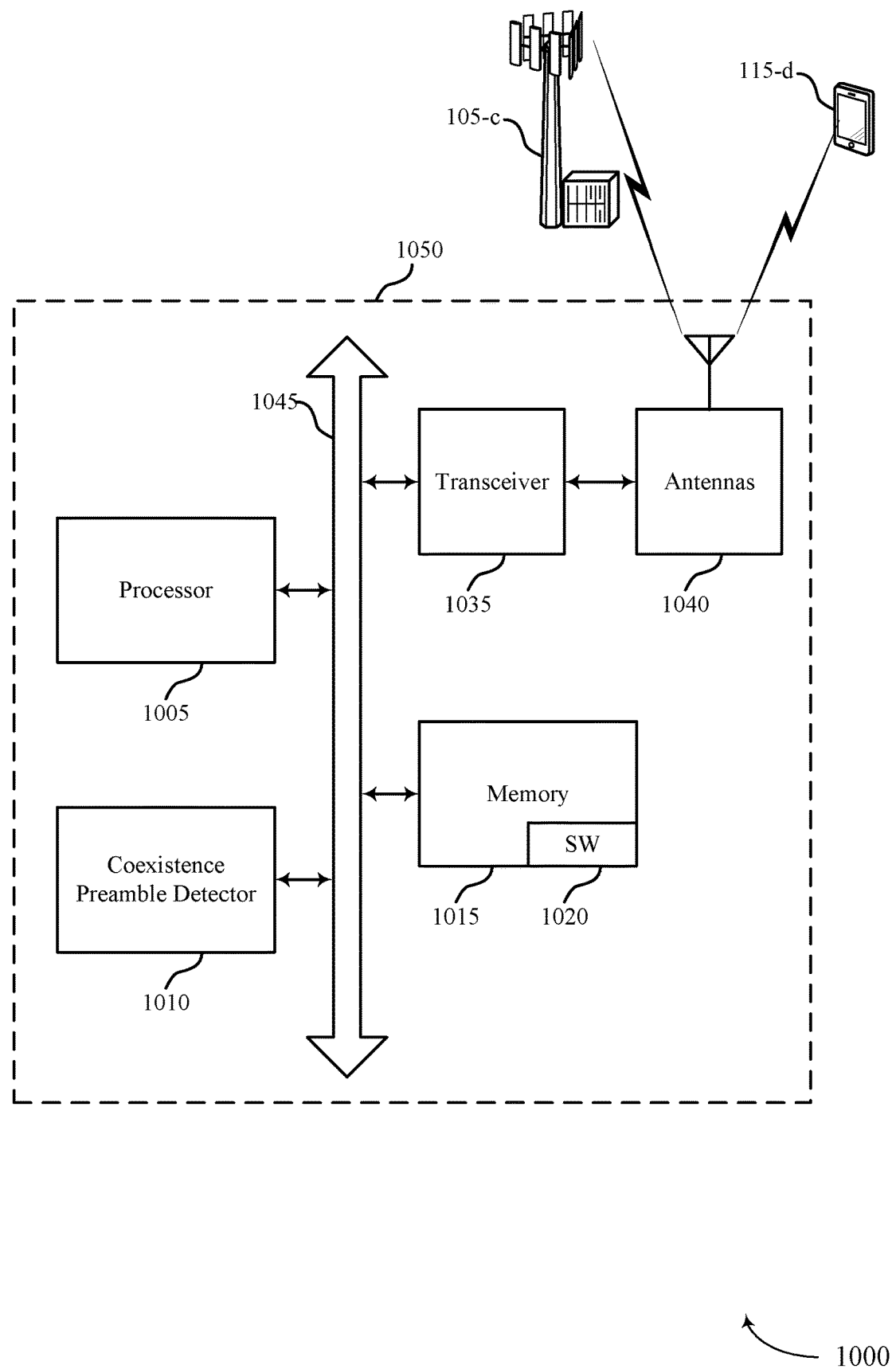
FIG. 10 illustrates a block diagram of a system including a base station that supports an enhanced preamble waveform for coexistence in accordance with various aspects of the present disclosure.

FIG. 10 shows a diagram of a system 1000 including a wireless device 1050 configured for an enhanced preamble waveform for coexistence in accordance with various aspects of the present disclosure. System 1000 may include wireless device 1050, which may be an example of a wireless device 700, a wireless device 800, a UE 115, a base station 105, a STA 155, or an AP 150 described herein with reference to FIGS. 1, 2, 7, and 8. Wireless device 1050 may include a coexistence preamble detector 1010, which may be an example of a coexistence preamble detector 735 described with reference to FIGS. 5 and 6. Wireless device 1050 may also include components for bi-directional voice and data communications including components for transmitting communications and components for receiving communications. For example, wireless device 1050 may communicate bi-directionally with base station 105-c or UE 115-d.

Wireless device 1050 may also include a processor 1005, and memory 1015 (including software (SW) 1020), a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While wireless device 1050 may include a single antenna 1040, wireless device 1050 may also have multiple antennas 1040 capable of concurrently transmitting or receiving multiple wireless transmissions.

The memory 1015 may include RAM and ROM. The memory 1015 may store computer-readable, computer-executable software/firmware code 1020 including instructions that, when executed, cause the processor 1005 to perform various functions described herein (e.g., generating an enhanced preamble waveform for coexistence, etc.). Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an ASIC, etc.). The processor 1005 may include various special purpose processors such as encoders, queue processing modules, base band processors, radio head controllers, digital signal processor (DSPs), and the like.

Figure 11:
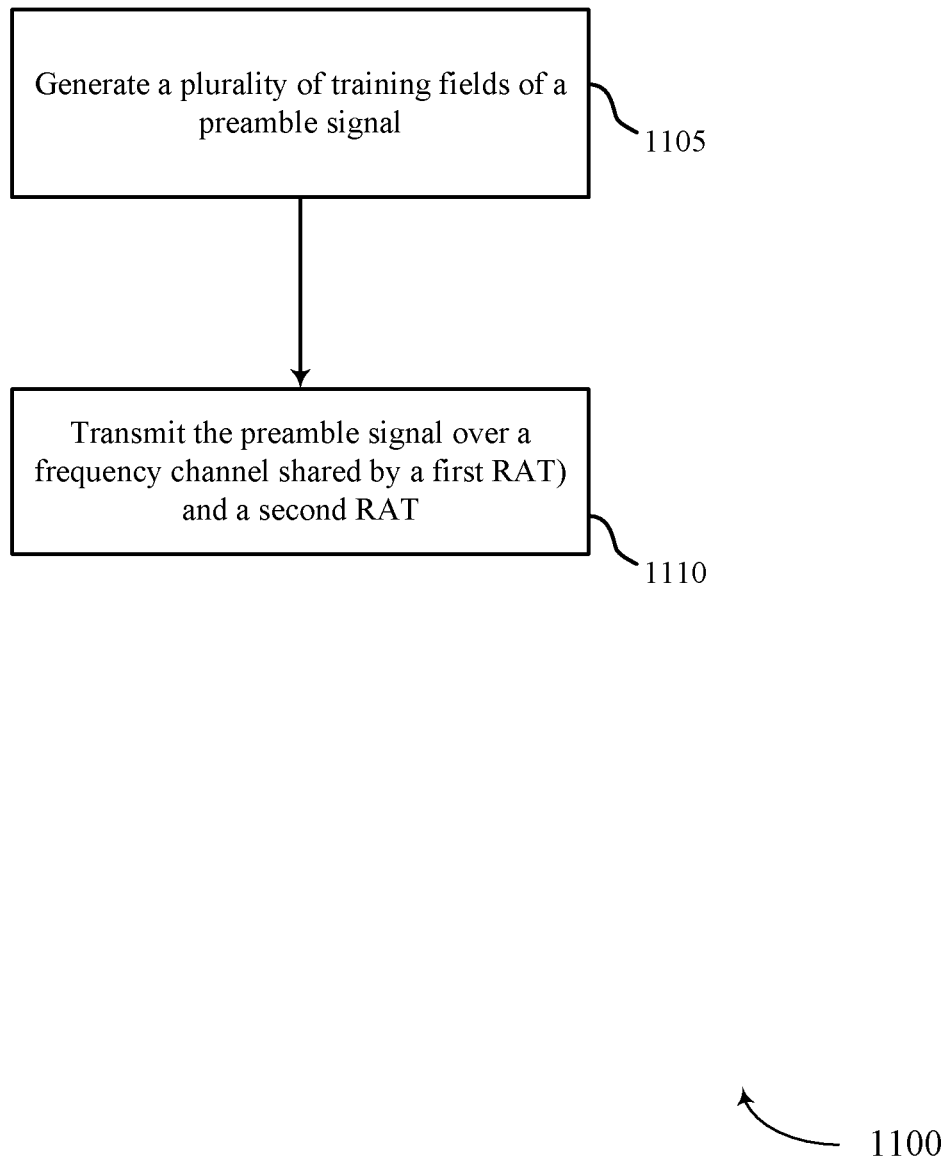
FIG. 11 illustrates a method for an enhanced preamble waveform for coexistence in accordance with various aspects of the present disclosure.

FIG. 11 shows a flowchart illustrating a method 1100 for an enhanced preamble waveform for coexistence in accordance with various aspects of the present disclosure. The operations of method 1100 may be implemented by a device, such as a UE 115 or base station 105, or its components as described with reference to FIGS. 1-10. For example, the operations of method 1100 may be performed by the coexistence preamble generator 545 as described with reference to FIGS. 5 and 6. In some examples, a device may execute a set of codes to control the functional elements of the device to perform the functions described below. Additionally or alternatively, the device may perform aspects the functions described below using special-purpose hardware. The device may operate in a system that includes a frequency channel shared by a first RAT (e.g., WLAN) and a second RAT (e.g., LTE-U). The device may employ the second RAT.

At block 1105, the device may generate a plurality of training fields of a preamble signal. One or more of the plurality of training fields may have a signal property that is associated with detection by devices employing the first RAT. The preamble signal may convey at least one characteristic that is associated with the second RAT as described herein with reference to FIGS. 2-4. In certain examples, the operations of block 1105 may be performed by the coexistence preamble generator 545 as described herein with reference to FIG. 5. At block 1110, the device transmit the preamble signal over the frequency channel. In certain examples, the operations of block 1110 may be performed by the transmitter 535 as described herein with reference to FIG. 6.

Figure 12:
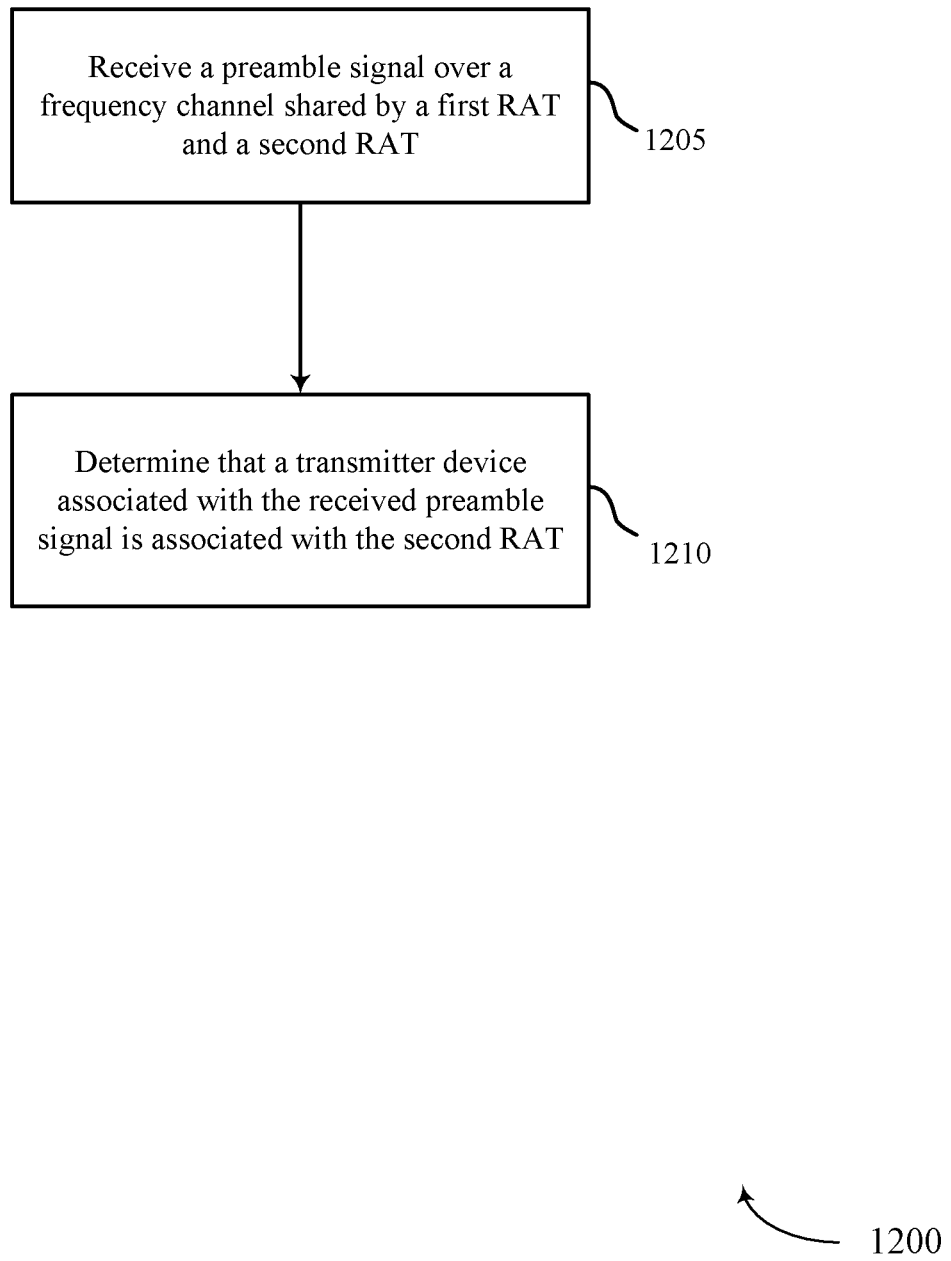
FIG. 12 illustrates a method for an enhanced preamble waveform for coexistence in accordance with various aspects of the present disclosure.

FIG. 12 shows a flowchart illustrating a method 1200 for an enhanced preamble waveform for coexistence in accordance with various aspects of the present disclosure. The operations of method 1200 may be implemented by a device, such as a UE 115, base station 105, STA 155, AP 150, or its components as described with reference to FIGS. 1-10. For example, the operations of method 1200 may be performed by the coexistence preamble detector 735 as described with reference to FIGS. 7 and 8. In some examples, a device may execute a set of codes to control the functional elements of the device to perform the functions described below. Additionally or alternatively, the device may perform aspects the functions described below using special-purpose hardware. The method 1200 may also incorporate aspects of methods 1100 of FIG. 11. The device may operate in a system that includes a frequency channel shared by a first RAT (e.g., WLAN) and a second RAT (e.g., LTE-U).

At block 1205, the device may receive a preamble signal over the frequency channel shared by the first RAT and the second RAT. The preamble signal may include a plurality of training fields. One or more of the plurality of training fields may have a signal property that is associated with detection by devices employing the first RAT. The preamble signal may convey at least one characteristic that is associated with the second RAT as described herein with reference to FIGS. 2-4. In certain examples, the operations of block 1205 may be performed by the receiver 705 or preamble monitor 715 as described herein with reference to FIG. 7. At block 1210, the device may determine that a transmitter device associated with the received preamble signal is associated with the second RAT by identifying, in the received preamble signal, the signal property that is associated with detection by devices employing the first RAT and by detecting the at least one characteristic that is associated with the second RAT as described herein with reference to FIGS. 2-4. In certain examples, the operations of block 1210 may be performed by the coexistence preamble detector 735 as described herein with reference to FIG. 7.

Thus, methods 1100 and 1200 may provide for an enhanced preamble waveform for coexistence. It should be noted that methods 1100 and 1200 describe possible implementation, and that the operations and the steps may be rearranged or otherwise modified such that other implementations are possible. In some examples, aspects from two or more of the methods 1100 and 1200 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as CDMA, time division multiple access TDMA, frequency division multiple access FDMA, orthogonal frequency division multiple access OFDMA, single carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication over a frequency channel shared by a first radio access technology (RAT) and a second RAT, comprising:
    generating, by a device employing the second RAT, a plurality of training fields of a preamble signal, wherein one or more of the plurality of training fields has a signal property that is associated with detection by a first set of devices employing the first RAT, and wherein the one or more of the plurality of training fields convey at least one characteristic to a second set of devices employing the second RAT, and wherein the at least one characteristic associated with the device employing the second RAT comprises:
        aligning at least one of a beginning or an end of at least one of a first training field or a second training field of the plurality of training fields with at least one of a symbol period, a subframe period, or a frame period common to the device and at least one other device for communication according to the second RAT, wherein the aligning is selected from a first alignment to convey a first characteristic associated with the device employing the second RAT and a second alignment to convey a second characteristic associated with the device employing the second RAT; and
    transmitting the preamble signal over the frequency channel.

2. The method of claim 1, wherein the aligning indicates, to the second set of devices, that the device is associated with the second RAT.

3. The method of claim 1, wherein the at least one characteristic comprises a phase shift between the first training field and the second training field of the plurality of training fields.

4. The method of claim 1, wherein the at least one characteristic comprises at least one of a sequence or a tone mapping associated with at least one of the first training field or the second training field of the plurality of training fields.

5. The method of claim 1, wherein generating the plurality of training fields comprises:
    generating the first training field, the second training field, and a third training field, wherein a signal associated with the third training field has an inverted sign at intervals that are less than or equal to one half of the symbol period associated with the first training field.

6. The method of claim 1, wherein the at least one characteristic indicates at least one of a device type or an operator associated with the second RAT.

7. The method of claim 1, wherein the first RAT comprises a wireless local area network (WLAN) RAT and the plurality of training fields comprises a short training field (STF) and a long training field (LTF) for the WLAN RAT, and wherein the second RAT comprises a Long Term Evolution (LTE) RAT or an LTE-Unlicensed (LTE-U) RAT.

8. A method of wireless communication, comprising:
    receiving a preamble signal over a frequency channel shared by a first radio access technology (RAT) and a second RAT, the preamble signal comprising a plurality of training fields, wherein one or more of the plurality of training fields has a signal property that is associated with detection by a first set of devices employing the first RAT; and
    determining that a transmitter device associated with the received preamble signal is associated with the second RAT by identifying, in the received preamble signal, the signal property that is associated with the detection by the first set of devices employing the first RAT and detecting at least one characteristic indicating a device type associated with the transmitter device, wherein detecting the at least one characteristic indicating the device type associated with the transmitter device employing the second RAT comprises:
        detecting at least one of a beginning and an end of the preamble signal is aligned with a symbol period common to the transmitter device and at least one other device for communication according to the second RAT,
        wherein detecting at least one of the beginning and the end of the preamble signal is aligned with the symbol period comprises detecting a first alignment that conveys a first characteristic associated with the transmitter device or detecting a second alignment that conveys a second characteristic associated with the transmitter device.

9. The method of claim 8, wherein determining that the transmitter device associated with the received preamble signal is associated with the second RAT comprises:
    determining the preamble signal is aligned with the symbol period associated with the second RAT.

10. The method of claim 8, wherein detecting the at least one characteristic comprises:
    detecting, in the received preamble signal, a phase shift between a first training field and a second training field of the plurality of training fields that is identifiable by the second RAT.

11. The method of claim 8, wherein the at least one characteristic comprises at least one of a sequence associated with at least one of a first training field and a second training field of the plurality of training fields that is identifiable by the second RAT or a tone mapping associated with at least one of the first training field and the second training field that is identifiable by the second RAT.

12. The method of claim 8, wherein detecting the at least one characteristic comprises:
identifying, in the received preamble signal, a first training field and a second training field of the plurality of training fields associated with the first RAT; and
identifying, in the received preamble signal, a third training field of the plurality of training fields associated with the second RAT, wherein a signal associated with the third training field is inverted at intervals that are a divisor of the symbol period that is identifiable by the first training field.

13. The method of claim 8, further comprising:
identifying at least one of the device type or an operator associated with the transmitter device based at least in part on the at least one characteristic.

14. An apparatus for wireless communication over a frequency channel shared by a first radio access technology (RAT) and a second RAT, the apparatus employing the second RAT and comprising:
a processor;
memory in electronic communication with the processor; and
instructions stored in the memory and operable, when executed by the processor, to cause the apparatus to:
generate a plurality of training fields of a preamble signal, wherein one or more of the plurality of training fields has a signal property that is associated with detection by a first set of devices employing the first RAT, and wherein the one or more of the plurality of training fields convey at least one characteristic to a second set of devices employing the second RAT, and wherein the instructions to cause the apparatus to generate the plurality of training fields are further executable to cause the apparatus to:
align at least one of a beginning or an end of at least one of a first training field or a second training field of the plurality of training fields with at least one of a symbol period, a subframe period, or a frame period common to a first device and at least one other device for communication according to the second RAT, wherein the at least one characteristic comprises the aligning, and wherein the aligning is selected from a first alignment to convey a first characteristic associated with the apparatus and a second alignment to convey a second characteristic associated with the apparatus; and
transmit the preamble signal over the frequency channel.

15. The apparatus of claim 14, wherein the aligning indicates, to the second set of devices, that the apparatus is associated with the second RAT.

16. The apparatus of claim 14, wherein the at least one characteristic comprises a phase shift between the first training field and the second training field of the plurality of training fields.

17. The apparatus of claim 14, wherein the at least one characteristic comprises at least one of a sequence or a tone mapping associated with at least one of the first training field or the second training field of the plurality of training fields.

18. The apparatus of claim 14, wherein the instructions to cause the apparatus to generate the plurality of training fields are further executable to cause the apparatus to:
generate the first training field, the second training field, and a third training field, wherein a signal associated with the third training field has an inverted sign at intervals that are less than or equal to one half of the symbol period associated with the first training field.

19. The apparatus of claim 14, wherein the at least one characteristic indicates at least one of a device type or an operator associated with the second RAT.

20. The apparatus of claim 14, wherein the first RAT comprises a wireless local area network (WLAN) RAT and the plurality of training fields comprises a short training field (STF) and a long training field (LTF) for the WLAN RAT, and wherein the second RAT comprises a Long Term Evolution (LTE) RAT or an LTE-Unlicensed (LTE-U) RAT.

* * * * *